United States Patent
Harney

(10) Patent No.: US 10,657,335 B2
(45) Date of Patent: May 19, 2020

(54) SYSTEM AND METHOD FOR PROGRAMMING PLUGGABLE TRANSCEIVERS

(71) Applicant: Les Systemes Fonex Data Inc., St-Laurent (CA)

(72) Inventor: Gordon Harney, Ottawa (CA)

(73) Assignee: Les Systemes Fonex Data Inc., Saint Laurent (CA)

( * ) Notice: Subject to any disclaimer, the term of this patent is extended or adjusted under 35 U.S.C. 154(b) by 51 days.

(21) Appl. No.: 16/228,158

(22) Filed: Dec. 20, 2018

(65) Prior Publication Data

US 2019/0147202 A1   May 16, 2019

Related U.S. Application Data

(63) Continuation of application No. PCT/CA2018/050021, filed on Jan. 11, 2018.

(Continued)

(51) Int. Cl.
   *G06K 7/10*  (2006.01)
   *H04B 1/3805*  (2015.01)
   (Continued)

(52) U.S. Cl.
   CPC ..... *G06K 7/10227* (2013.01); *G06F 9/44505* (2013.01); *G06K 7/10316* (2013.01);
   (Continued)

(58) Field of Classification Search
   CPC .. G06K 7/10227; G06K 7/10366; H04B 1/38; H04B 1/3805; H04B 10/40;
   (Continued)

(56) References Cited

U.S. PATENT DOCUMENTS 9,159,013 B2   10/2015   Zhao et al.
9,165,172 B2   10/2015   Kilian
(Continued)

FOREIGN PATENT DOCUMENTS

CA   2526577 A1   12/2004
EP   2755354 B1   7/2014

OTHER PUBLICATIONS

International Search Report issued patent application No. PCT/CA2018/050021, dated Apr. 16, 2018.
(Continued)

*Primary Examiner* — Thien M Le
*Assistant Examiner* — April A Taylor
(74) *Attorney, Agent, or Firm* — The Concept Law Group, PA; Scott D. Smiley; Scott M. Garrett

(57) ABSTRACT

Systems and methods for programming pluggable transceivers are provided. In an embodiment, a method includes receiving RFID data from an RFID device in proximity to a network transceiver via an RFID antenna in the network transceiver, said RFID data defining an operating configuration of the network transceiver; and programming the network transceiver according to the operating configuration defined by the received RFID data. In an embodiment, a network transceiver includes: a host interface for connecting to a host; a network interface for transmitting and receiving signals to and from a network; an RFID antenna for receiving RFID data; and a controller in operative communication with the network interface and the RFID antenna, said controller operating the network interface according to an operating configuration, wherein the operating configuration of the controller is programmed using the RFID data received via the RFID antenna. Various other embodiments are also provided.

37 Claims, 15 Drawing Sheets

Related U.S. Application Data

(60) Provisional application No. 62/463,296, filed on Feb. 24, 2017.

(51) Int. Cl.
| | | |
|---|---|---|
| *H04W 4/80* | (2018.01) | |
| *G06F 9/445* | (2018.01) | |
| *H04L 12/24* | (2006.01) | |
| *H04B 5/00* | (2006.01) | |
| *H04W 4/50* | (2018.01) | |

(52) U.S. Cl.
CPC ......... *H04B 1/3805* (2013.01); *H04B 5/0062* (2013.01); *H04L 41/0809* (2013.01); *H04L 41/0846* (2013.01); *H04W 4/80* (2018.02); *H04W 4/50* (2018.02)

(58) Field of Classification Search
CPC ..... H04W 4/80; G02B 6/3895; G02B 6/4246; G02B 6/4261; G02B 6/4277; G02B 6/4278; G02B 6/4284; G02B 6/4292; G02B 6/4293
See application file for complete search history.

(56) References Cited

U.S. PATENT DOCUMENTS

| | | | |
|---|---|---|---|
| 9,210,530 B2 | 12/2015 | Wei | |
| 9,391,706 B2 | 7/2016 | Lewis et al. | |
| 9,793,997 B2 | 10/2017 | Lewis et al. | |
| 2004/0198079 A1* | 10/2004 | Aronson | G02B 6/4201 439/76.1 |
| 2007/0055470 A1* | 3/2007 | Pietrzyk | G05B 19/05 702/104 |
| 2010/0052863 A1* | 3/2010 | Renfro, Jr. | G02B 6/3878 340/10.4 |
| 2012/0262281 A1 | 10/2012 | Edwards et al. | |
| 2013/0136458 A1* | 5/2013 | Kawase | H04B 10/40 398/135 |
| 2016/0085697 A1* | 3/2016 | Lavoie | G06F 13/102 710/302 |

OTHER PUBLICATIONS

Written Opinion issued patent application No. PCT/CA2018/050021, dated Apr. 16, 2016.

\* cited by examiner

| A0h | # Bytes | Name | Description |
|---|---|---|---|
| BASE ID FIELDS | | | |
| 0 | 1 | Identifier | Type of transceiver |
| 1 | 1 | Ext. Identifier | Extended identifier of type of transceiver |
| 2 | 1 | Connector | Code for connector type |
| 3-10 | 8 | Transceiver | Code for electronic or optical compatibility |
| 11 | 1 | Encoding | Code for high speed serial encoding algorithm |
| 12 | 1 | BR, Nominal | Nominal signalling rate, units of 100MBd. |
| 13 | 1 | Rate Identifier | Type of rate select functionality |
| 14 | 1 | Length(SMF,km) | Link length supported for single mode fiber, units of km |
| 15 | 1 | Length (SMF) | Link length supported for single mode fiber, units of 100 m |
| 16 | 1 | Length (50um) | Link length supported for 50 um OM2 fiber, units of 10 m |
| 17 | 1 | Length (62.5um) | Link length supported for 62.5 um OM1 fiber, units of 10 m |
| 18 | 1 | Length (OM4 or copper cable) | Link length supported for 50um OM4 fiber, units of 10m. Alternatively copper or direct attach cable, units of m |
| 19 | 1 | Length (OM3) | Link length supported for 50 um OM3 fiber, units of 10 m |
| 20-35 | 16 | Vendor name | SFP vendor name (ASCII) |
| 36 | 1 | Transceiver | Code for electronic or optical compatibility |
| 37-39 | 3 | Vendor OUI | SFP vendor IEEE company ID |
| 40-55 | 16 | Vendor PN | Part number provided by SFP vendor (ASCII) |
| 56-59 | 4 | Vendor rev | Revision level for part number provided by vendor (ASCII) |
| 60-61 | 2 | Wavelength | Laser wavelength (Passive/Active Cable Specification Compliance) |
| 62 | 1 | Unallocated | |
| 63 | 1 | CC_BASE | Check code for Base ID Fields (addresses 0 to 62) |
| EXTENDED ID FIELDS | | | |
| 64-65 | 2 | Options | Indicates which optional transceiver signals are implemented |
| 66 | 1 | BR, max | Upper bit rate margin, units of % |
| 67 | 1 | BR, min | Lower bit rate margin, units of % |
| 68-83 | 16 | Vendor SN | Serial number provided by vendor (ASCII) |
| 84-91 | 8 | Date code | Vendor's manufacturing date code |
| 92 | 1 | Diagnostic Monitoring Type | Indicates which type of diagnostic monitoring is implemented (if any) in the transceiver |
| 93 | 1 | Enhanced Options | Indicates which optional enhanced features are implemented (if any) in the transceiver |
| 94 | 1 | SFF-8472 Compliance | Indicates which revision of SFF-8472 the transceiver complies with. |
| 95 | 1 | CC_EXT | Check code for the Extended ID Fields (addresses 64 to 94) |
| VENDOR SPECIFIC ID FIELDS | | | |
| 96-127 | 32 | Vendor Specific | Vendor Specific EEPROM |
| 128-255 | 128 | Reserved | Reserved for SFF-8079 |

FIG. 12

| A2h | # Bytes | Name | Description |
|---|---|---|---|
| | | | DIAGNOSTIC AND CONTROL/STATUS FIELDS |
| 0-39 | 40 | A/W Thresholds | Diagnostic Flag Alarm and Warning Thresholds |
| 40-55 | 16 | Optional A/W Thresholds | Thresholds for optional Laser Temperature and TEC Current alarms and warnings |
| 56-91 | 36 | Ext Cal Constants | Diagnostic calibration constants for optional External Calibration |
| 92-94 | 3 | Unallocated | |
| 95 | 1 | CC_DMI | Check code for Base Diagnostic Fields (addresses 0 to 94) |
| 96-105 | 10 | Diagnostics | Diagnostic Monitor Data (internally or externally calibrated) |
| 106-109 | 4 | Optional Diagnostics | Monitor Data for Optional Laser temperature and TEC current |
| 110 | 1 | Status/Control | Optional Status and Control Bits |
| 111 | 1 | Reserved | Reserved for SFF-8079 |
| 112-113 | 2 | Alarm Flags | Diagnostic Alarm Flag Status Bits |
| 114 | 1 | Unallocated | |
| 115 | 1 | CDR Unlocked | Optional flags indicating that Tx or Rx CDR is unlocked |
| 116-117 | 2 | Warning Flags | Diagnostic Warning Flag Status Bits |
| 118-119 | 2 | Ext Status/Control | Extended module control and status bytes |
| | | | GENERAL USE FIELDS |
| 120-126 | 7 | Vendor Specific | Vendor specific memory addresses |
| 127 | 1 | Table Select | Optional Page Select |

FIG. 13

| A2h | # Bytes | Name | Description |
|---|---|---|---|
| | | | Page 00-01h |
| 128-247 | 120 | User EEPROM | User writable non-volatile memory |
| 248-255 | 8 | Vendor Control | Vendor specific control addresses |
| | | | Page 02h |
| 128-129 | 2 | Reserved | Reserved for SFF-8690 (Tunable Transmitter) |
| 130 | 1 | Reserved | Reserved for future receiver controls |
| 131 | 1 | Rx Decision Threshold | RDT value setting |
| 132-172 | 41 | Reserved | Reserved for SFF-8690 |
| 173-255 | 83 | Unallocated | |

FIG. 14

SYSTEM AND METHOD FOR PROGRAMMING PLUGGABLE TRANSCEIVERS

CROSS REFERENCE

This application is a bypass continuation of, and claims priority to PCT Application No. PCT/CA2018/050021, filed Jan. 11, 2018, and to its priority application, U.S. Provisional Patent Application No. 62/463,296, filed Feb. 24, 2017, the entirety of each of which are hereby incorporated by reference.

FIELD OF THE DISCLOSURE

The present disclosure relates generally to pluggable transceivers, and more particularly to programming, provisioning or configuring a pluggable transceiver using Radio-Frequency Identification, Near Field Communications, and/or other types of communication based on radio waves (hereinafter collectively referred to as "RFID").

BACKGROUND

Communications and data service providers are deploying large numbers of pluggable transceivers across their networks to support the increasing demand for connectivity and bandwidth. They are quick and easy to install enabling rapid service delivery and network capacity upgrades. Pluggable transceivers include a broad range of standard device types, for example multi-source agreement (MSA) pluggable transceivers; small form-factor pluggable (SFP), enhanced SFP (SFP+), XFP, SFP, Quad SFP+ (QSFP+), SFP28, QSFP28, C form-factor pluggable types (CFP), etc., and proprietary "smart" SFP types. In addition, pluggable transceivers include other standard and proprietary device types, for example; RJ45 Power over Ethernet (PoE) devices and dongles, USB devices and dongles, Internet of Things (IoT) telematics devices and sensors, communications, computer and storage system plugin cards such as optical transponders, muxponders, and switch network interface cards, packet switch and router interface cards, computer server cards, wireless transceiver and transponder cards, data acquisition and control equipment cards, audio/video encoder and decoder cards, etc., and mobile devices, having various configurations, form factors, network and or host interfaces, functions, and management interfaces.

In general, a pluggable transceiver is configured with an optical or electrical network interface specified by an MSA and or other standards, for example IEEE 802.3 Working Group, ITU Telecommunication Standardization Sector, the Internet Engineering Task Force, the Metro Ethernet Forum, the Society of Cable Telecommunications Engineers, Society of Motion Picture and Television Engineers, etc. Consequently, pluggable transceivers support a plurality of network interface protocols, such as Gigabit Ethernet, OTN, CWDM, DWDM, Fiber Channel, SONET/SDH, GPON, CPRI, RFoG, etc. optical protocols, and Ethernet, xDSL, Gfast, T1/E1/T3/E3, etc. electrical protocols, or wireless protocols such as LTE, Wi-Fi, Bluetooth, RFID, NFC, or Serial Digital Interface protocols, etc. In addition, pluggable transceivers support a plurality of network interface transmission formats, rates and wavelengths/frequencies. The network interface is typically configured with the appropriate connector type to interface with the physical transmission medium, for example, fiber optic, RJ45, etc. connector. Many pluggable transceivers, for example an Ethernet switch line card, provide one or more pluggable network interfaces each configured with a pluggable transceiver interface port that can accept a plurality of MSA pluggable transceiver types (e.g. an SFP+) to be installed and provide the desired network interface.

In general, a pluggable transceiver is configured with a host interface or adapter as specified in an MSA and or other standards and or other proprietary specification. Consequently, pluggable transceivers support a plurality of host interfaces, such as Ethernet MSA, USB, PoE, SCTE RF MSA, SMPTE SDI MSA, PCI, PICMG, SGPIO, VMEBus, ATCA, etc host interfaces. The host interface includes at least one of the following; communications, management, power and mechanical interfaces, and enable a pluggable transceiver to be installed in or connected to a host (i.e. via a physical interface to attach the transceiver to the host), and/or to operate when installed in or connected to a host (i.e. by allowing the transceiver to send and receive signals to and from the host, and for managing the transmission of such signals). The management interface enables a host to identify, program, configure and manage a pluggable transceiver, for example, the host is configured to read or write an MSA host interface management memory map, data fields and values. Management information is usually programmed into the pluggable transceiver non-volatile memory during the manufacturing process, etc. This type of memory is commonly an EEPROM, FRAM, NOR Flash or NAND Flash. Manufacturers may also program the pluggable transceiver memory with proprietary information, for example using proprietary MSA map extensions, data fields and values to configure and manage a "smart" SFP. The management interface is typically implemented using a management protocol and communications interface, for example a host interface providing an MSA memory mapped management protocol defining a set of memory address, data fields and values that are read and or written to memory using an $I^2C$ EEPROM communications interface. In some pluggable transceivers, programming, configuration and management of the pluggable transceiver is performed by a remote management system connected to a network, the pluggable transceiver configured to connect to such network via the network interface and or host interface communications interface, and such network and or host interfaces providing an in-band management interface (e.g. an Ethernet/IP communications interface and SNMP, CLI, and or Web GUI management interfaces). In addition, the host management interface may include other hardware control/status signals to operate the pluggable transceiver.

Manufacturers combine various integrated circuits, processors, programmable logic devices, memory, programs and data to configure a pluggable transceiver to provide functions and interfaces for specific applications and or operational configurations. Typically, a manufacturer will program and or configure a pluggable transceiver memory using proprietary methods during the manufacturing process and according to a desired operating configuration using predetermined programs and or data defining said desired operating configuration. Typically, a pluggable transceiver operator will configure a pluggable transceiver memory in the field via the host interface or network interface according to a desired operating configuration with data defining such desired operating configuration.

In general, pluggable transceivers are equipped with a controller, wherein the controller programs, configures and operates the pluggable transceiver. For such pluggable transceivers, a manufacturer will program the memory with programs and or data used by the controller. In addition, the memory may also be programmed with other programmable device programs and or data, for example storing the configuration of a Field Programmable Gate Array (FPGA), and IC configuration register data. For example, the programs and or data stored in memory and the logic gates in an FGPA are configured according to a desired operating configuration to provide an SFP supporting Gigabit Ethernet configured to provide network interface device (NID) functionality with corresponding network and host interfaces. The pluggable transceiver operating configuration is typically identified by a pluggable transceiver identification code, for example a product equipment code and or model number, etc.

In general, pluggable transceivers provide the capability to at least partially change or modify the pluggable transceiver host interface management data stored in memory. For example a pluggable transceiver can be configured in the field to support operations and maintenance activities such as setting host interface alarm and warning threshold parameters, laser output power output, receiver input, etc. Some pluggable transceivers provide the capability to change or modify the all pluggable transceiver programs and or data stored in memory in the field to support operations and maintenance using proprietary file (e.g. a file containing programs and or data) download and upgrade methods or using proprietary field programming systems, for example such upgrades used for fixing program defects or enabling new functionality, etc.

Some networking equipment manufacturers (NEMs) recommend that the operators of their equipment, for example service providers, use standard MSA pluggable transceivers wherein one or more host interface memory map data field value stored in memory must match the corresponding host interface memory map identification data field values provided by their proprietary pluggable transceivers. Consequently, some MSA compliant transceivers cannot be used in particular NEM equipment unless their host interface memory map identification data fields are programmed exactly according to the NEM host interface requirements.

Some service providers require that pluggable transceivers be pre-programmed and or pre-configured prior to deployment to meet their operational requirements. Consequently, the pluggable transceiver memory must be programmed with specific host interface management data, such as for example thresholds for digital diagnostic interface voltage and temperature monitoring, and product equipment code identification. In addition, proprietary pluggable transceivers configured to provide network functions, for example an SFP configured as a network interface device, a service assurance device, a protocol gateway device, optical network terminal device, etc., must have their memories programmed with specific proprietary host interface management data.

Therefore, as a matter of practice, a pluggable transceiver may support a plurality of operational configurations based on standards, proprietary, and service provider requirements that are programmed in the pluggable transceiver memory during the manufacturing process, wherein each operational configuration may be specific to a manufacturers product equipment code. For example, a manufacturer may receive an MSA compliant pluggable transceiver as raw material, perform quality control inspection and testing, and program its memory for a desired operating configuration as specified by one of many possible finished good product equipment codes for that raw material, the finished goods is labeled with the product equipment code information and shipped to a service provider. While this approach enables simple and traceable material management systems, it can lead to large and varied inventories of purpose-built (e.g. programmed) products, causing high supply chain overhead costs and potentially slowing service delivery operations when service or maintenance events are un-forecasted and the required parts are not available.

Other service providers have opted for an alternate approach to implementing their supply chain and configure each pluggable transceiver of a given product equipment code according one or more operating configurations. This approach has lead manufacturers and third parties to develop proprietary pluggable transceiver host interface programming devices that typically include a computer configured with a pluggable transceiver interface and proprietary software, some of which have been adapted for field use.

When not installed, the programmed operating configuration of a pluggable transceiver can be determined using the product equipment code as described above which usually entails scanning or reading the device product equipment code or bar code label, and if equipped cross referencing that information to find the product specification in a local database or through a network database. However, when the pluggable transceiver is configured without changing the product equipment code as described above, the actual device programming and or configuration can only be determined by reading the host interface memory map data field values electronically.

Based on current practice, a service provider can incur significant capital and operational expenses acquiring, configuring, managing and maintaining pluggable transceivers throughout their lifecycle. Likewise, pluggable transceiver manufacturers incur significant costs in producing and supplying a very broad portfolio of like pluggable transceivers. Therefore, there exists a need to quickly program or configure pluggable transceivers in the field with minimal equipment, and to minimize the size of the pluggable transceiver inventory, and to minimize the time to deploy a pluggable transceiver, and to minimize the time required to identify a pluggable transceiver and its programmed operating configuration in the supply chain or during installation and maintenance activities, and to minimize programming, configuration and identification errors introduced by operators during the manufacturing process and the service lifecycle.

Accordingly, there is a need for a method and apparatus for

SUMMARY

According to an aspect, a system to program a pluggable transceiver using RFID is provided. The system includes: a smart label, configured with a passive RFID tag adapted to store pluggable transceiver programming information, the smart label configured to attach to a pluggable transceiver; a pluggable transceiver, adapted with an RFID reader configured with an RFID antenna, the RFID reader and RFID antenna configured to communicate with the smart label, the RFID reader configured to communicate with a controller; the pluggable transceiver configured with a housing adapted with a designated area having a radio frequency (RF) interface, such housing area used to attach or install said smart label; and a program running on said controller invokes the RFID reader to interrogate the smart label to obtain the pluggable transceiver programming information and programs the pluggable transceiver memory with information such as data and or programs using the pluggable transceiver programming information.

According to an aspect, a method for programming a pluggable transceiver is provided. The method includes the steps of: a) providing a smart label comprising an RFID tag having data stored thereon defining a desired programmed configuration of the pluggable transceiver; b) attaching the smart label to an exterior of the pluggable transceiver; c) reading the data stored on the RFID tag using an RFID reader embedded in the pluggable transceiver.

According to an aspect, a method for programming a pluggable transceiver is provided. The method includes the steps of: a) providing a smart label comprising an RFID tag having data stored thereon defining a desired programmed configuration of the pluggable transceiver; b) attaching the smart label to an exterior of the pluggable transceiver; c) reading the data stored on the RFID tag using an RFID reader embedded in the pluggable transceiver; and d) programming the pluggable transceiver according to the desired programmed configuration defined by the data read in step c).

According to an aspect, a method for programming a pluggable transceiver is provided. The method includes the steps of: a) powering up the pluggable transceiver; b) operating an RFID reader in the pluggable transceiver to read an RFID tag in proximity to the pluggable transceiver; and c) upon receiving data stored on the RFID tag corresponding to a predetermined configuration of the pluggable transceiver, programming the pluggable transceiver to operate in the predetermined configuration.

According to an aspect, a method for programming a pluggable transceiver is provided. The method includes the steps of: a) using an interface on an exterior of the pluggable transceiver to provide data corresponding to a desired operating configuration of the pluggable transceiver; b) installing, connecting or inserting the pluggable transceiver into a host device; c) powering up the pluggable transceiver; d) reading the data provided using the interface; and e) programming the pluggable transceiver according to the desired operating configuration defined by the data read in step d).

According to an aspect, a method for programming a network transceiver is provided. The method includes the steps of: a) receiving RFID data from an RFID device in proximity to the network transceiver via an RFID antenna in the network transceiver, said RFID data defining an operating configuration of the network transceiver; and b) programming the network transceiver according to the operating configuration defined by the received RFID data.

According to an aspect, a method for programming a network transceiver is provided. The method includes the steps of: a) providing a smart label comprising an RFID tag having data stored thereon defining an operating configuration of the network transceiver; b) attaching the smart label to an exterior of the network transceiver; c) reading the data stored on the RFID tag using an RFID receiver embedded in the network transceiver; and d) programming the network transceiver according to the operating configuration defined by the data read in step c).

According to an aspect, a smart label for programming a pluggable transceiver is provided. The smart label includes: a body having a bottom surface; a fastening mechanism for fastening the smart label to an exterior of a pluggable transceiver; and an RFID tag secured to the body, the RFID tag comprising an RFID memory and an RFID antenna, the RFID memory having stored thereon data defining a desired programmed configuration, the RFID memory and RFID antenna configured to transmit data to an RFID reader in the pluggable transceiver upon interrogation therefrom. In an embodiment, said RFID antenna at least partially protrudes from the bottom surface of the smart label. In an embodiment, the fastening mechanism comprises an adhesive provided on the bottom surface of the smart label. In an embodiment, said body and said adhesive attenuates electromagnetic emissions from said pluggable transceiver.

According to an aspect, a smart label for programming a network transceiver is provided. The smart label includes: a substrate; and an RFID tag secured to or embedded in the substrate, the RFID tag having stored thereon RFID data defining an operating configuration of the network transceiver; wherein the RFID tag is configured to, upon interrogation from an RFID reader in the network transceiver, transmit the RFID data to the RFID reader for programming the network transceiver in the operating configuration.

According to an aspect, a pluggable transceiver is provided. The pluggable transceiver includes a housing; and a circuit board assembly at least partially contained within the housing, the circuit board assembly including: a controller for controlling the operation of the pluggable transceiver; an RFID reader and an RFID antenna; wherein the controller configured to operate the RFID reader to read data stored on an RFID tag proximate to the pluggable transceiver housing, and to operate the pluggable transceiver according to an operating configuration defined by the data. In an embodiment, said RFID antenna surface mounted on the circuit board assembly in alignment with the aperture and contained within the housing. In an embodiment, said RFID antenna mounted proximate in the aperture and not protruding from the housing, the RFID antenna electrically connected to the circuit board assembly. In an embodiment, the circuit board assembly at least partially protrudes from the housing.

According to an aspect, a network transceiver is provided. The network transceiver includes a host interface for connecting to a host; a network interface for transmitting and receiving signals to and from a network; an RFID antenna for receiving RFID data; and a controller in operative communication with the network interface and the RFID antenna, said controller operating the network interface according to an operating configuration, wherein the operating configuration of the controller is programmed using the RFID data received via the RFID antenna.

According to an aspect, a network transceiver is provided. The network transceiver includes a host interface for connecting to a host; a network interface for transmitting and receiving signals to and from a network; a controller in operative communication with the host interface and the network interface, said controller operating the host interface and the network interface according to a programmed operating configuration; non-volatile memory having stored thereon a plurality of predefined operating configurations of the controller; and a programming interface for selecting one of the predefined operating configurations, and programming the controller using the selected operating configuration.

According to an aspect, a pluggable transceiver programming system is provided. The system includes a smart label and a pluggable transceiver as described above.

According to an aspect, a pluggable transceiver programming system is provided. The system includes: a pluggable transceiver comprising a housing; and a smart label securable to the housing.

According to an aspect, a programmable network transceiver assembly is provided. The assembly includes a network transceiver comprising a host interface for connecting to a host, a network interface for transmitting and receiving signals to and from a network, an antenna for receiving RFID data, and a controller in operative communication with the host interface, the network interface, and the antenna, said controller operating the host interface and the network interface according to an operating configuration; and a smart label secured to the network transceiver, the smart label comprising a substrate and an RFID tag secured or embedded in the substrate, the RFID tag having stored thereon RFID data defining an operating configuration of the network interface; wherein the network transceiver's controller is programmed in the operating configuration following receipt of the RFID data from the RFID tag via the network transceiver's antenna.

According to an aspect, a non-transitory computer-readable medium is provided. The computer-readable medium has instructions stored thereon which, when executed by a processor in a network transceiver, cause the processor to: a) receive RFID data from an RFID device in proximity to the network transceiver via an RFID antenna, said RFID data defining an operating configuration of the network transceiver; and b) program a controller in the network transceiver according to the operating configuration defined by the received RFID data.

According to an aspect, a system to program a pluggable transceiver using RFID is provided. The system includes: a pluggable transceiver, configured with a housing adapted with a designated area having an RF interface, such housing area used to interface with an external RFID reader/writer ("external RFID reader"), the pluggable transceiver configured with an RFID memory adapted to store pluggable transceiver programming information and configured with an RFID antenna, the RFID memory and an RFID antenna configured to communicate with the external RFID reader, and the RFID memory configured to communicate with a controller; and a program running on said controller reads the RFID memory to obtain the programming information and programs the pluggable transceiver memory with information such as data and or programs using the programming information; an external RFID reader adapted to store pluggable transceiver programming information, the external RFID reader in communication with said RFID memory; the external RFID reader adapted to program said RFID memory with the programming information. In an embodiment, the external RFID reader adapted to transmit and receive pluggable transceiver programming information and data from a remote management system or database via a network.

According to an aspect, a method for programming a pluggable transceiver is provided. The method includes the steps of: a) providing an external RFID reader having data stored thereon defining a desired programmed configuration of the pluggable transceiver; b) writing the data stored on the external RFID reader to an RFID memory embedded in the pluggable transceiver.

According to an aspect, a method for programming a pluggable transceiver is provided. The method includes the steps of: a) providing an external RFID reader having data stored thereon defining a desired programmed configuration of the pluggable transceiver; b) writing the data stored on the external RFID reader to an RFID memory embedded in the pluggable transceiver; c) reading the data stored in the RFID memory using a controller embedded in the pluggable transceiver; and d) programming the pluggable transceiver according to the desired programmed configuration defined by the data read in step c).

According to an aspect, a method for programming a pluggable transceiver is provided. The method includes the steps of: a) operating the external RFID reader to write to the RFID memory in proximity to the external RFID reader; b) powering up the pluggable transceiver; and c) upon reading data stored in the RFID memory corresponding to a predetermined configuration of the pluggable transceiver, programming the pluggable transceiver to operate in the predetermined configuration.

According to an aspect, a method for programming a pluggable transceiver is provided. The method includes the steps of: a) using an interface on an exterior of the pluggable transceiver to provide data corresponding to a desired operating configuration of the pluggable transceiver.

According to an aspect, a method for programming a pluggable transceiver is provided. The method includes the steps of: a) using an interface on an exterior of the pluggable transceiver to provide data corresponding to a desired operating configuration of the pluggable transceiver; b) installing, connecting or inserting the pluggable transceiver into a host device; c) powering up the pluggable transceiver; d) reading the data provided using the interface; and e) programming the pluggable transceiver according to the desired operating configuration defined by the data read in step d).

According to an aspect, an external RFID reader for programming a pluggable transceiver is provided. The external RFID reader includes: a memory having stored thereon data defining a desired programmed configuration; the external RFID reader configured to transmit the data to an RFID memory in the pluggable transceiver; a controller for controlling operation of the external reader; wherein the controller configured to write the data to an RFID memory within the pluggable transceiver housing proximate to the external RFID reader. In an embodiment, the external RFID reader reads the data and or pluggable transceiver identification and configuration data from said RFID memory and stores said data in its memory, the external RFID reader configured to transmit and receive said pluggable transceiver data to a remote management system or database via a network.

According to an aspect, a pluggable transceiver is provided. The pluggable transceiver includes a housing; and a circuit board assembly at least partially contained within the housing, the circuit board assembly including: a controller for controlling operation of the pluggable transceiver; an RFID memory having stored thereon data defining a desired programmed and an RFID antenna, the RFID memory and RFID antenna transmitting and receiving the data to an external RFID reader proximate to the pluggable transceiver housing upon interrogation therefrom; wherein the controller is configured to read the data stored on an RFID memory, and to operate the pluggable transceiver according to an operating configuration defined by the data. In an embodiment, said RFID antenna mounted proximate in the aperture and not protruding from the housing, the RFID antenna electrically connected to the circuit board assembly. In an embodiment, the circuit board assembly at least partially protrudes from the housing.

According to another aspect, a pluggable transceiver is provided. The pluggable transceiver includes a housing; and a circuit board assembly at least partially contained within the housing, the circuit board assembly including: a controller for controlling operation of the pluggable transceiver; an RFID memory having stored thereon data defining a desired programmed configuration and an RFID antenna, the RFID memory and RFID antenna transmitting and receiving the data to an external RFID reader proximate to the pluggable transceiver housing upon interrogation therefrom; a passive internal radio signal RFID repeater ("internal RFID repeater") configured to relay RFID communications between an external RFID reader and the RFID memory therethrough; and wherein the controller is configured to read the data stored on the RFID memory and to operate the pluggable transceiver according to an operating configuration defined by the data. In an embodiment, said RFID antenna surface is mounted on the circuit board assembly and contained within the housing; said internal RFID repeater is mounted to an interior of the housing, the internal RFID repeater containing two repeater RFID antennae, one such repeater RFID antenna mounted proximate to the aperture and not protruding from the housing, the second such repeater RFID antenna mounted proximate to said RFID antenna and contained within the housing; wherein the two repeater RFID antennae are electrically interconnected and enable RFID communications therethrough. In an embodiment, said RFID antenna surface mounted on the circuit board assembly and contained within the housing; said internal RFID repeater mounted to an exterior of the housing, the internal RFID repeater containing two repeater RFID antennae, one such repeater RFID antenna mounted to an exterior of the housing proximate to the aperture, the second such repeater RFID antenna mounted through the aperture and contained at least partially within the housing proximate to said RFID antenna; wherein the two repeater RFID antennae are interconnected and enable RFID communications therethrough. In an embodiment, the circuit board assembly at least partially protrudes from the housing.

According to an aspect, an external RFID repeater is provided. The external RFID repeater includes at least one substrate; and a circuit assembly contained within the substrate, the circuit assembly including: a designated area to place an external RFID reader and a designated area to place a pluggable transceiver, each such area containing a repeater RFID antenna, the first such repeater RFID antenna interfacing with the external RFID reader and the second such repeater RFID antenna interfacing with a pluggable transceiver, and an electrical connection between said first and second repeater RFID antennae; wherein the first and second repeater RFID antennae are interconnected to enable RFID communications between an external RFID reader and an RFID memory embedded in a pluggable transceiver therethrough. In an embodiment, the external RFID repeater includes: an external RFID reader substrate with a designated area containing a repeater RFID antenna configured to connect to a cable; a pluggable transceiver substrate with a designated area containing a repeater RFID antenna configured to connect to a cable; an interconnecting cable; wherein the first and second repeater RFID antennae are interconnected with the cable to enable RFID communications between an external RFID reader and an RFID memory therethrough. In an embodiment, the coupled antenna structure includes a passive component configured to ensure antenna resonance matching. In an embodiment, the passive component is constructed using the same substrate and conductive material of the antenna structures.

According to an aspect, a pluggable transceiver programming system is provided. The system includes an external RFID reader and a pluggable transceiver as described above.

According to an aspect, a pluggable transceiver programming system is provided. The system includes a remote management system or database, a network, an external RFID reader and a pluggable transceiver as described above.

According to an aspect, a pluggable transceiver programming system is provided. The system includes an external RFID reader, an external RFID repeater and a pluggable transceiver as described above.

In an embodiment, said smart label includes a radio frequency identification RFID tag, said RFID tag adapted store information used to program the pluggable transceiver. In an embodiment, said smart label is installable on or attachable to the housing, said smart label being adapted to receive and to transmit the programming information.

In an embodiment, the pluggable transceiver includes an RFID reader and an RFID antenna, said RFID reader being in communication with a pluggable transceiver controller and with the smart label.

In an embodiment, the housing includes a designated area to attach or install the smart label. In an embodiment, the designated area enables communications between the RFID reader and the smart label through the housing. In an embodiment, the designated area enables communications between the RFID reader and the smart label within the housing.

In an embodiment, the pluggable transceiver is connected to a host, and during controller initialization, the controller executes a program, said program invoking the RFID reader to interrogate the smart label, thereby obtaining the programming information and subsequently programming the pluggable transceiver memory with data and/or programs using such programming information, and completing the pluggable transceiver initialization.

In an embodiment, during controller re-initialization, the controller executes a program, said program invoking the RFID reader to interrogate the smart label, obtain the programming information, and determine not to program the pluggable transceiver memory with data and/or programs using programming information, and completing the pluggable transceiver initialization.

In an embodiment, said RFID memory adapted store information used to program the pluggable transceiver. In an embodiment, said RFID memory configured with an RFID antenna, said RFID memory and RFID antenna being adapted to receive and to transmit the programming information.

In an embodiment, the pluggable transceiver includes an RFID memory, said RFID memory being in communication with a pluggable transceiver controller and external RFID reader.

In an embodiment, the housing includes a designated area to position an external RFID reader. In an embodiment, the designated area enables communications between the external RFID reader and the RFID memory through the housing.

In an embodiment, the external RFID reader being in communication with an RFID memory, the external RFID reader executes a program to write the pluggable transceiver programming information to the RFID memory. In an embodiment, the external RFID reader executes a program to read the pluggable transceiver information stored in the RFID memory, and program the RFID memory with data and/or programs using said programming information and pluggable transceiver information. In an embodiment, the pluggable transceiver information stored in the RFID memory contains at least identification and or configuration data.

In an embodiment, the pluggable transceiver is connected to a host, and during controller initialization, the controller executes a program, said program reading the RFID memory, thereby obtaining the programming information and subsequently programming the pluggable transceiver memory with data and/or programs using such programming information, and completing the pluggable transceiver initialization.

In an embodiment, during controller re-initialization, the controller executes a program, said program reading the RFID memory, obtaining the programming information, and determines not to program the pluggable transceiver memory with data and/or programs using programming information, and completing the pluggable transceiver initialization.

In an embodiment, the designated area RF interface includes at least one aperture.

In an embodiment, the designated area RF interface includes at least two apertures, each such aperture containing a magnetically permeable core.

In an embodiment, the designated area RF interface includes a dielectric interface surrounded by shielding material such as to create an opening for magnetic coupling to enable RFID communications therethrough while keeping the electric aperture small to avoid EMI radiation from that opening in the enclosure. For example, the maximum linear dimension of the aperture size can be about 6 mm, and preferably have an area of less than 36 mm$^2$, and preferably still less than 29 mm$^2$.

In an embodiment, the pluggable transceiver includes an internal RFID repeater, said internal RFID repeater configured to enable RFID communications between the aperture and the RFID antenna therethrough.

In an embodiment, during the controller initialization, a program programs the memory using pre-determined programming information stored in memory and/or the program initializes the pluggable transceiver to operate in a predetermined state when the programming information is not installed, unknown, missing, failed, or the pluggable transceiver programming information is not valid or has changed or is not compatible with the pluggable transceiver. In an embodiment, such program periodically or on interrupt reads the programming information during operation of the pluggable transceiver to determine a status of the programming information, and programs the pluggable transceiver accordingly. In an embodiment, such program erases the programmed configuration of the pluggable transceiver when the programming information is invalid or changed or missing.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 12 is a table that describes the SFP+ identification memory map addresses and data fields in accordance with SFF-8472;

FIG. 13 is a table that describes the SFP+ diagnostic and control/status memory map addresses and data fields in accordance with SFF-8472;

FIG. 14 is a table that describes the SFP+ diagnostic and control/status page tables memory map addresses and data fields in accordance with SFF-8472.

Figure 1:
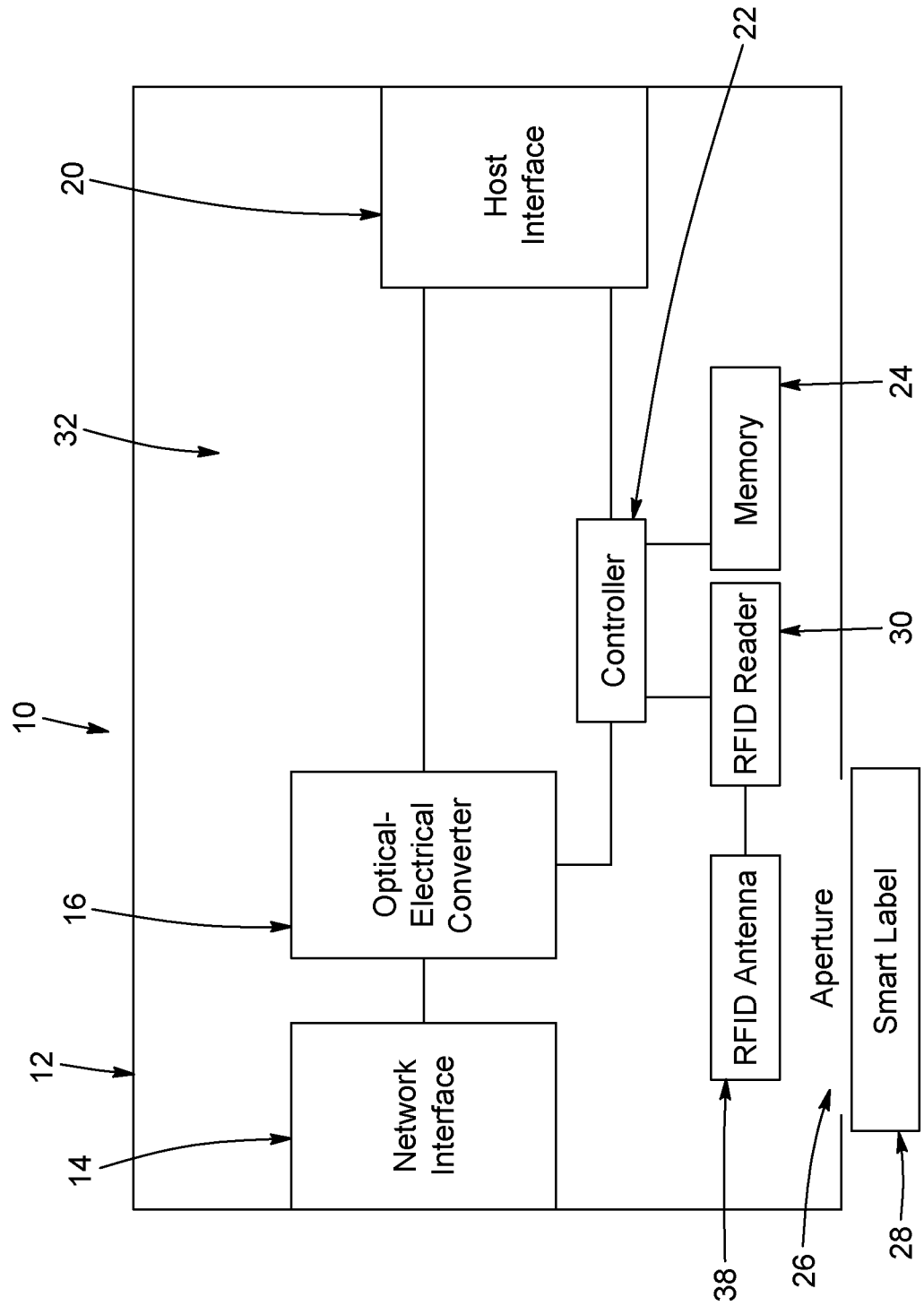
FIG. 1 is a block diagram of an optical pluggable transceiver incorporating a smart label with an RFID tag and an RFID reader, according to an embodiment.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

Broadly described, systems and methods for programming network transceivers, such as pluggable transceivers, are provided. In some embodiments, a system for programming a pluggable transceiver includes memory that is adapted to store pluggable transceiver programming information or data which can be transmitted or received via RFID, and is thus referred to herein as "RFID memory". Different types of RFID memory are described herein, and the RFID memory is configured to interface with a pluggable transceiver in different ways. In some embodiments, the RFID memory is embedded in an RFID tag ("tag RFID memory") and the RFID tag is bonded to the body of a label (e.g. a bar code label) to form a "smart label". In such embodiments, a pluggable transceiver can be configured with a housing adapted with a designated area having an RF interface, and this area can be used to attach or install the smart label. The pluggable transceiver can be adapted with an RFID reader/writer (i.e. hardware which can transmit and/or receive data via RFID, hereinafter referred to as an "RFID reader" for simplicity) in communication with a controller and the smart label. In some embodiments, the pluggable transceiver can be configured with a dual-access RFID memory configured with an RF interface and an electrical interface, the RFID memory configured as a surface mounted integrated circuit and installed on the pluggable transceiver printed circuit board assembly. In such embodiments, the pluggable transceiver can be configured with a housing adapted with a designated area having an RF interface and used to position an external RFID reader, said RFID memory being in communication with a controller and the external RFID reader.

Preferably, the RFID memory is programmed with RFID data which can include programming information or data which define a desired operating configuration of the pluggable transceiver, using an external RFID reader. In such configurations, the pluggable transceiver controller can read the RFID data from the RFID memory, and program the pluggable transceiver according to the desired operating configuration using the RFID data read from the RFID memory. The programming information defined by said RFID data can be used by the controller to program the pluggable transceiver non-volatile memory and/or to operate the pluggable transceiver. For example, programming information or data defined in the RFID data can consist of at least one of the following:

MSA and or other standard and or proprietary host interface data fields and values, for example manufacturer, part number (e.g. product equipment code), serial number, wavelength, alarm thresholds, etc. used to configure and or manage the transceiver;

configuration data used to program an ASIC, FPGA, or other IC configuration registers;

controller, processor or programmable logic device programs, for example initialization, boot, programming, operating or application programs;

network address;

memory address pointers that point to memory address locations within the pluggable transceiver non-volatile memory where the actual programming information or programmed information is stored;

configuration and installation data used to install programs such as operating system programs, programmable logic device programs, application programs, etc.;

compatibility data;

RFID memory configuration information;

programming information version data;

licensing data;

encryption keys; and password.

A pluggable transceiver having its memory programmed using such programming information or data can be said to be in a programmed configuration.

It should be noted that the pluggable transceiver non-volatile memory may be implemented using at least one memory integrated circuit device or memory within a programmable integrated circuit device, for example a microcontroller, microprocessor, FPGA, etc., or as a memory within an application specific integrated circuit device, or a system on a chip (SoC) device, or a combination thereof. It should be also noted that the pluggable transceiver controller may be implemented using at least one programmable integrated circuit device, for example a microcontroller, microprocessor, FPGA, SoC, etc., or as a controller within an application specific integrated circuit device, for example a Laser Driver and Limiting Post Amplifier with Digital Diagnostics, or a combination thereof.

In accordance with embodiments of the present disclosure, when a pluggable transceiver is installed in a host, it is powered up and the pluggable transceiver controller begins an initialization process, wherein a program invokes the controller to read RFID data stored in the RFID memory containing programming information, verify the compatibility of the pluggable transceiver with such programming information, automatically program the pluggable transceiver memory using the programming information when first initialized with such programming information, and completes the initialization process rendering the pluggable transceiver in a programmed configuration. For example, once programmed, the pluggable transceiver can be fully operational and ready for service, and can provide an MSA SFP+ transceiver host interface memory map containing data fields programmed with data defining a specific operating configuration. The pluggable transceiver controller can be further configured to read the RFID memory periodically after said first initialization and to maintain, change, or remove its current programmed configuration based on comparing the data read from the RFID memory and its current programmed configuration. For example, when such a pluggable transceiver is first installed in a host, its memory can be programmed using the programming information during the initialization process. Once the initialization is completed, the memory can contain a programmed configuration and the pluggable transceiver can operate according to the programmed configuration. However, in most pluggable transceivers, the programmed configuration stored in the memory can be at least partially modified or changed by an operator via the host and or network interface, wherein the controller is configured to not change the programmed configuration upon subsequent controller initializations and thereby maintaining said host operator changes to the programmed configuration. In this sense, embodiments of the pluggable transceiver described herein can be referred to as "self-programming" pluggable transceivers.

In the present disclosure, the term "pluggable transceiver" can refer to any device, equipment or system having at least a configurable transmitter and/or receiver, such as a network interface for sending and/or receiving signals to and from a network. A configuration of the network transmitter and/or receiver can be stored in a non-volatile memory and the transmitter or receiver is configured using a controller. Preferably, the pluggable transceiver provides an interface to connect to at least one host device, equipment or system (hereafter referred to as a "host"). It is appreciated that a pluggable transceiver can connect to a host device via various types of interfaces, including a physical interface for physically securing the transceiver in the host and/or a communications interface for transmitting and/or receiving signals to and from the host. As can be appreciated, a pluggable transceiver is "pluggable" in the sense that it is replaceable and/or is detachably couplable to a host, for example an MSA SFP+ transceiver can be installed in a host communications system SFP+ transceiver interface port. By means of non-limiting examples, pluggable transceivers can include (among others):

MSA and MSA compatible transceivers;
RJ45 PoE dongles;
USB dongles;
communications or computer or storage equipment, for example plug in cards, line cards, equipment and system cases or chassis or cabinets configured to provide communications or computer or storage functions such as optical transponders, muxponders, switches, line amplifiers, etc., and packet routers, switches, firewalls, gateways, network interface devices, customer premise equipment, etc., and modems, media converters, multiplexers, etc., personal computers, mobile wireless devices, etc.;
Internet of Things (IoT) or telematics or remote terminal unit (RTU) or supervisory and control data acquisition (SCADA) devices and plugin cards and equipment and systems and cabinets, for example analog I/O controllers, digital I/O controllers, sensors, etc.; and
integrated transceiver technology embedded in a device, equipment or system and interfaces a printed circuit card assembly to a fiber optic cable or copper cable or wireless connection.

A pluggable transceiver and system architecture which includes a level of intelligence to be downloaded from an RFID memory into a pluggable transceiver is disclosed hereafter.

FIG. 1 illustrates the block diagram of a pluggable transceiver 10 with a smart label 28, according to an embodiment. In the present embodiment, the pluggable transceiver 10 is an optical pluggable transceiver, but it can be appreciated that similar structures can apply to other types of transceivers as well. The pluggable transceiver 10 includes a housing 12 containing a printed circuit board assembly 32 (PCBA) on which components of the pluggable transceiver 10 are connected and supported. The housing 12 is an assembly of parts preferably configured according to a standard and/or proprietary mechanical specification, for example the metal housing of an MSA compliant SFP+. In the illustrated embodiment, the PCBA 32 at least partially protrudes from the housing 12 to connect to a host. It should be noted that as used in this specification, the term "housing" is not necessarily limited to a single part or a plurality of parts that contains all the components on the PCBA 32, and may refer to one or more parts of the PCBA 32 that define an exterior profile of the pluggable transceiver 10. In other embodiments, the housing can include metal, plastic, glass, or epoxy, etc., or parts or combinations thereof. In some embodiments, the PCBA 32 forms the housing 12, for example the housing 12 is the PCBA 32 and the smart label 28 is mounted to the PCBA 32. In other embodiments, the PCBA 32 forms a part of the housing 12, for example the housing 12 configured as an assembly of a PCBA 32 and a metal faceplate attached to the PCBA 32. In an embodiment, the housing 12 configured according to an MSA standard, for example a small form-factor pluggable (SFP) transceiver, or enhanced small form-factor pluggable (SFP+) transceiver, or SFP28, or XFP, or QSFP+, or QSFP28, or CFP, including proprietary "smart SFP" transceivers, etc. In other embodiments, the housing 12 can be a standard or proprietary electronics enclosure, for example a printed circuit card assembly, or a shelf, cage, case, cabinet, rackmount assembly, etc. In an embodiment, the network interface 14 and host interface 20 connectors are connected to or form part of the PCBA 32. In general, the pluggable transceiver housing 12 preferably provides a mechanical structure for the pluggable transceiver 10 and can include one or more of the following features:

support and physical protection for the components that it contains;
parts and mechanisms to install it in a host such as connectors, guides, clips, pins, ejectors, fasteners, etc.;
thermal control features such as a heat sink;
protect users from safety hazards;
shielding to attenuate electro-magnetic emissions radiating from the pluggable transceiver 10;
one or more connectors to connect to a host and or a network;
one or more apertures used for example for interface connectors, accessing test, calibration or fastening points, viewing visual indicators (e.g. LEDs), thermal control and ventilation, etc.; and
areas on the housing 12 and or PCBA 32 used to attach bar code and or other labels to identify the pluggable transceiver 10.

As shown in the illustrated embodiment, the pluggable transceiver 10 includes a network interface 14, an optical-electrical converter 16 connected to the network interface 14, and a host interface 20 connected to the optical-electrical converter 16. The network interface 14 is configured to connect to an optical device, such as a fiber optic cable. In the present embodiment, the network interface 14 is configured to detachably couple to the optical device, thereby allowing the pluggable transceiver 10 to be detachably connected to such optical device. The optical-electrical converter 16 is configured to convert an optical communication signal received from the network interface 14 into one or more electrical communication signals. The optical-electrical converter 16 is configured to transmit and receive the electrical communication signals from the host interface 20. The optical-electrical converter can include one or more components such as, for example, a transmitter optical sub-assembly (TOSA) and a receiver optical sub-assembly (ROSA), or a bidirectional optical sub-assembly (BOSA) and optical wavelength multiplexer, a laser driver, a receiver amplifier, or a coherent optical transmitter and receiver sub-system, etc. In some embodiments, the optical-electrical converter 16 can be configured with a controller and or a digital signal processor. In some embodiments, the optical-electrical converter 16 can be configured to transmit status signals to, and receive control signals from, the host interface 20. In other embodiments, the pluggable transceiver 10 can be an electrical transceiver, wherein the optical-electrical converter 16 is replaced by an electrical transceiver and the network interface 14 is configured to detachably connect to an electrical device, such as for example an RJ45 cable. In other embodiments, the pluggable transceiver 10 can be a wireless transceiver, wherein the optical-electrical converter 16 is replaced by a wireless transceiver or modem and the network interface 14 configured with a wireless network antenna.

Preferably, the network interface 14 is configured according to at least one standard and/or proprietary specification, for example MSA INF-8074i SFP standard specification or MSA SFF-8472 SFP+ and IEEE 802.3z Gigabit Ethernet standard specifications. Consequently, pluggable transceivers 10 can support a plurality of network interface 14 transmission protocols, formats, wavelengths, frequencies, rates, distances and media types, for example protocols such as Gigabit Ethernet, SONET/SDH, OTN, PON, CWDM, DWDM, Fiber Channel, etc. optical protocols, or 1000Base-T Ethernet or PoE, T1/E1/T3/E3, xDSL, Gfast, USB, etc. electrical protocols, or Wi-Fi, LTE, Bluetooth, Zigbee, RFID, NFC, etc. wireless protocols, and transmission bit rates, such as 10/100/1000 Mbps Ethernet, 1 GE, 10 GE, 100 GE, OC192 SONET, STM-64 SDH, 100G OTN/DWDM, 10G Fiber Channel, 200G Coherent DWDM, etc. In an embodiment, the optical-electrical converter 16 is configurable, wherein the optical-electrical converter 16 is configured according to a specified network interface 14 using a controller. In another embodiment, the pluggable transceiver 10 network interface 14 can be configured with at least one pluggable transceiver interface port (e.g. an MSA SFP cage assembly and host interface connector on a proprietary Ethernet switch line card), wherein each such port configured receive a pluggable transceiver 10 (e.g. an MSA SFP+ transceiver).

In the present embodiment, the host interface 20 is configured to connect to a host pluggable transceiver interface. During normal operation, the host interface 20 is connected to the host and is configured to receive and transmit signals from said host. It is appreciated, however, that in other embodiments, the host interface 20 can simply support and/or physically engage the transceiver in the host, without necessarily allowing for the communication of signals with the host. Preferably, the host interface 20 is configured to detachably connect to a pluggable transceiver interface (e.g. a port) provided by a host thereby allowing the pluggable transceiver 10 to be detachably connected to such host. The host interface 20 can include a plurality of interfaces used to operate the pluggable transceiver such as for example for communications, management, power and mechanical interfaces. Preferably, the host interface 20 is configured to transmit and receive signals from a host according to at least one standard specification, for example the host interface 20 of a Gigabit Ethernet 1000Base-LX MSA SFP+ transceiver can be configured to connect to a 1000BASE-X SFP port (e.g. specified for a group of Ethernet physical layer standards within the IEEE 802.3.z standard) on an Ethernet switch. In other embodiments, the host interface 20 can be a proprietary interface.

In the present embodiment, the management interface is configured with an I²C EEPROM communications interface, for example used to configure and manage the pluggable transceiver memory 24. In other embodiments the management interface can be configured with a Management Data Input/Output (MDIO) or Serial Management Interface (SMI) or Media Independent Interface Management (MIIM) communications interface. In an embodiment, the management interface can be configured with an Ethernet communications interface, used to configure and manage the pluggable transceiver 10, and/or an IP communications interface.

Preferably, the management interface management information is defined by a standard or specification, such as an MSA standard. In the present embodiment, the identification and configuration data provided by the host interface 20 is at least partially stored in the memory 24. For example, the MSA SFP pluggable transceiver management interface management information can be specified in INF-8074i. In another example, the MSA SFP+ pluggable transceiver information can be specified in SFF-8472, wherein the MSA defines the management interface including the readable and writable digital diagnostic monitoring interface (DDMI) fields provided by the host interface 20. In another example, a host can read the pluggable transceiver 10 identification and configuration information such as the manufacturer, part number, serial number, wavelength, type, range, etc. including diagnostic and status information such as the transmit and receiver power, internal voltages and temperatures alarm and warning conditions, etc. via the host interface 20, and write pluggable transceiver configuration information such as alarm and warning threshold settings, enabling/disabling the optical transmitter, passwords for programming the memory 24, etc. via the host interface 20. Other detachable host interface 20 examples include PoE, USB, SCTE XFP-RF, SMPTE SDI, PCI, PICMG, SGPIO, VMEBus, ATCA, etc. interfaces, and Wi-Fi, LTE, Bluetooth, NFC, Zigbee, etc. wireless interfaces.

In the illustrated embodiment, the pluggable transceiver 10 receives communications signals, management signals, and DC power from the host interface 20 PCBA edge connector. In other embodiments, the host interface 20 can include a plurality of optical and or electrical connectors and or antenna, for communications, management. power connectors, etc. For example, the pluggable transceiver 10 can receive PoE power from the host interface 20. In another embodiment, the pluggable transceiver 10 can include an AC/DC power converter and receive AC power from a host interface 20. In another embodiment, the pluggable transceiver 10 can receive DC power from a battery. In other embodiments, the host interface 20 can be a pluggable transceiver interface (e.g. a standard MSA SFP cage assembly with host interface connector).

In the illustrated embodiment, the pluggable transceiver 10 includes a controller 22, for example a microcontroller, microprocessor, etc., the controller 22 being configured to interface with the host interface 20 and the memory 24 and the optical-electrical converter 16, wherein the controller 22 is adapted to operate the pluggable transceiver 10. The memory 24 is configured to store pluggable transceiver information, the information defining a programmed configuration. In the present embodiment, the controller 22 executes a program to operate the pluggable transceiver 10, for example a program that programs, configures, and/or manages the pluggable transceiver 10 ICs, functions, and/or interfaces. The controller 22 can execute a plurality of programs such as, for example, an initialization or boot program, operating system program, application program, etc. Preferably, the memory 24 is non-volatile, for example an electronically erasable programmable read-only memory (EEPROM). By means of non-limiting examples, the memory 24 can be configured to store a plurality of programs and or data; for example, controller initialization/boot, operating system, application programs and programmable logic device programs, and for example standard MSA host interface 20 memory mapped data fields and values, and for example IC configuration data. In the present embodiment, the information stored in memory 24 includes host interface 20 management information defined in an MSA, for example identification, diagnostic, control and status information used by a host to manage the pluggable transceiver 10. In an embodiment, the information stored in memory 24 can include proprietary host interface 20 management information defined in a proprietary specification, for example Ethernet MAC or IP address information used by a host to manage the pluggable transceiver 10. In an embodiment, the information stored in memory 24 can include data used to configure the pluggable transceiver 10 ICs, for example the optical-electrical converter 16 laser driver. In an embodiment, the information stored in memory 24 can include a controller 22 program used to operate the pluggable transceiver 10. In the present embodiment, the memory 24 is communicatively connected to the host interface 20 via the controller 22. For example, when the pluggable transceiver 10 is connected to a host, the memory 24 is communicatively connected to said host, wherein a controller in the host is configured to read and write data to the memory 24 via the host interface 20 to configure and manage the pluggable transceiver 10. The host can be configured to program the memory 24 in whole or in part with programs and or data using proprietary methods. In an embodiment, read only memory locations or data fields in the memory 24 can be password protected, with the host writing a password to one or more host interface 20 address locations or data fields prior to writing data to the memory 24 via the host interface 20. In other embodiments, the memory 24 can be directly connected to the host interface 20.

The memory 24 is typically programmed during the pluggable transceiver manufacturing process, wherein proprietary programming methods are used to program the memory 24 with programs and/or data. For example, such data can consist of an MSA SFP+ identification/configuration fields and values stored in memory 24 for host interface memory map locations in A0h, and diagnostic and control/status fields and values stored in memory 24 for host interface memory map locations A2h. In some embodiments, at least some of the memory 24 can be programmed via the host interface 20, for example when the pluggable transceiver 10 is installed in a host during installation, commissioning, provisioning, operational or maintenance activities, an operator using an interface on the host writes data via the host interface 20 to writeable data fields wherein said data is stored in the memory 24. For example, a host device can write diagnostic alarm and warning threshold data to the memory 24 via the host interface 20 writeable data fields in memory map locations A2h. In some embodiments, the memory 24 configured to be programmed via the host interface 20 using proprietary programming systems or programs.

Figure 2:
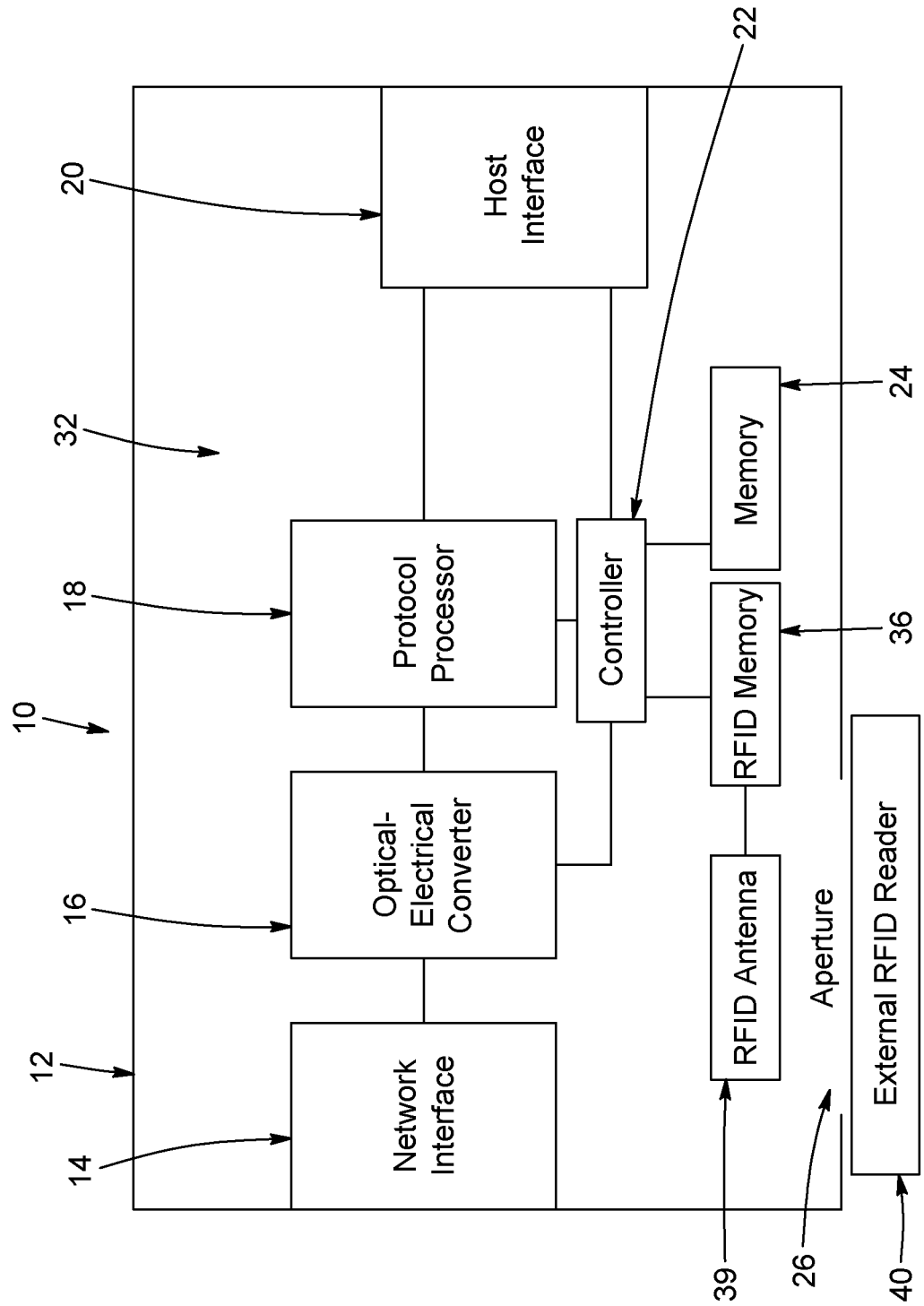
FIG. 2 is a block diagram of an optical pluggable transceiver incorporating a protocol processor, an RFID memory and an external RFID reader, according to an embodiment.

Pluggable transceivers are not limited to the configuration described, and the pluggable transceiver 10 may have other configurations and or may include additional components such as for example a protocol processor. The block diagram shown in FIG. 2 illustrates an optical pluggable transceiver 10 according to embodiments wherein the pluggable transceiver 10 includes a protocol processor 18 configured to process communications signals, for example packets and/or frames or combinations thereof. The protocol processor 18 is configured to connect to the optical-electrical converter 16 and to the host interface 20 and to the controller 22, wherein the controller 22 is configured to execute at least one program to configure and manage the protocol processor 18, for example programs to program, configure and/or manage the protocol processor 18. The protocol processor 18 is configured to receive signals, packets and/or frames from the optical-electrical converter 16, process the signals, packets and/or frames to provide a network function, and transmit them to the host interface 20 and vice versa. The optical-electrical converter 16 is configured to convert the electrical communications signals received from the protocol processor 18 to one or more optical communication signals and transmit the optical communication signals to the network interface 14. In some embodiments, the memory 24 can be communicatively connected to the host interface 14 via the protocol processor 18 and the controller 22. In some embodiments, the memory 24 can be communicatively connected to the network interface 14 via the protocol processor 18 and controller 22. In some embodiments, the memory 24 can be programmed or configured by a remote management system via a network, wherein such network is connected to the host interface 20 via a host and or to the network interface 14 via a cable.

In some embodiments, the protocol processor 18 can be implemented using one or more integrated circuits such as, for example, a microprocessor, network processor, digital signal processor (DSP), application specific integrated circuit (ASIC), field programmable gate array (FPGA), SoC, etc. Programmable devices (e.g. an FPGA) and/or memory can typically be programed at least partially during and after manufacturing. In some embodiments, the pluggable transceiver 10 can include a plurality of different protocol processors 18, for example the pluggable transceiver 10 can provide a T1 to packet gateway network function using a plurality of different protocol processors 18 configured to receive and process the T1 signals and frames, perform T1 to pseudowire mapping and MPLS packet encapsulation, and Ethernet packet encapsulation and transmission. In an embodiment, the protocol processor 18 can be configured to provide at least one network and/or management function, for example media conversion, rate adaption, network interface, network demarcation, network security, protocol gateway, service assurance, network testing, packet OAM, policing and marking, shaping, SLA performance monitoring, statistics collection, header manipulation, classification, filtering, bridging, switching, routing, aggregation, in-band management, etc. In some embodiments, the protocol processor 18 can include memory, such as for example random access memory (RAM) configured for storing packets and or processing information to analyze packets and or frames, etc., and non-volatile memory used to program a programmable logic device (e.g. an FPGA). In some embodiments, the protocol processor 18 can include a controller. In the present embodiment, at least one protocol processor 18 program is stored in the memory 24, and the program can be used by the controller 22 to program, configure, and/or to manage the protocol processor 18. In the present embodiment, the memory 24 is configured to store protocol processor 18 data such as for example identification, configuration, diagnostics, control and status data and or proprietary data.

The protocol processor 18 is preferably configured to provide a plurality of network functions and interface configurations, and the memory 24 is used by the host to program, configure and manage the protocol processor 18 to provide said network functions and interfaces. For example, an SFP pluggable transceiver 10 with a protocol processor 18 can be configured to provide T1 packet gateway functions, and the host interface 20 can be configured to provide read/write access to identification and configuration data, with such data being stored in memory 24. In an embodiment, the host interface 20 used to read/write the memory 24 can be proprietary, for example an extension or modification of a standard MSA SFP host interface 20 memory map and data field definitions. In an embodiment, the network interface 14 management interface used to read/write the memory 24 is proprietary, for example a Web GUI. In an embodiment, programming the memory 24 with programs for the controller 22 and protocol processor 18 and or with data is typically performed during the pluggable transceiver 10 manufacturing process using proprietary programming systems. For example, such data can consist of MSA SFP+ identification fields and values stored in memory 24 for host interface 20 memory map locations starting at A0h, and diagnostic and control/status data fields and values stored in memory 24 for host interface 20 memory map locations starting at A2h, and proprietary protocol processor 18 diagnostic, control and status data fields and values stored in memory 24 for host interface 20 memory map locations starting at A0h address 0x80h. In other embodiments, the memory 24 can be programmed using proprietary programming systems connected to the host interface 20. In other embodiments, the memory 24 can be at least partially programmed by a remote management system connected via a network to the host interface 20 and/or to the network interface 14, the host interface 20 and/or network interface 14 configured with a communication interface, for example Ethernet and IP interfaces, and with a corresponding management interface, for example SNMP, Web GUI (e.g. HTML/HTTP), CLI, etc.

In the embodiment illustrated in FIG. 1, the pluggable transceiver 10 is configured with an RFID reader 30 and RFID antenna 38 in communication with a smart label 28. The RFID reader 30 is in communication with the controller 22, and the controller 22 is configured to invoke the RFID reader 30 to read RFID data stored in the smart label 28 containing programming information or data. Preferably, the smart label 28 comprises an RFID device, such as at least one RFID tag, for example a specially configured integrated circuit (IC) configured with an RFID memory and connected to an RFID antenna. The smart label 28 is configured to attach to the housing 12, although it is appreciated that in other embodiments, the smart label 28 can be configured to attach to the PCBA 32. In the present embodiment, the smart label 28 includes printed information such as, for example, a product equipment code, serial number, and barcode, etc. The smart label 28 RFID memory can be configured with different types of memory, for example; reserved memory, Electronic Product Code (EPC) memory, tag ID (TID) memory, and user memory. For example, the reserved memory can store a kill password and an access password, the kill password permanently disables the tag and the access password locks and unlocks the RFID tag's write capabilities; the EPC memory can store the EPC information having a minimum of 96 bits of writable memory that can be used as a universal identifier giving a unique identity to a specific physical object and is typically used in many asset tracking applications; TID memory can be used to store a unique tag ID number programmed by the tag manufacturer and typically cannot be changed. User memory can store user writeable information. In some embodiments, the controller 22 can be configured to invoke the RFID reader 30 to write data to the smart label 28. In other embodiments, the RFID reader 30 can be in communication with a host via the host interface 20, said host configured to invoke the RFID reader 30 to read data stored in the smart label 28.

In an embodiment illustrated in FIG. 2, the pluggable transceiver 10 is configured with an RFID memory 36 and RFID antenna 39 in communication with an external RFID reader 40. The external RFID reader 40 is configured to read and write data to the RFID memory 36, and the RFID memory 36 is connected to the controller 22. The controller 22 is configured to read and write data to the RFID memory 36. In the illustrated embodiment, the RFID memory 36 is a dual-access RFID memory configured with an RF interface and an electrical interface, for example a specially configured integrated circuit (IC) with a passive RFID memory that can be read by an external RFID reader 40 using an RF interface, and can also be read by a controller 22 using an EEPROM electrical interface. Preferably, the RFID memory 36 is configured to attach to the PCBA 32, for example the RFID memory 36 can be a surface mounted IC. In an embodiment, the RFID memory 36 can be configured with different types of files or memory, for example: system file, capability file, and NFC Data Exchange Format (NDEF) file. For example, the system file can be a proprietary password protected file containing the RFID memory 36 device configuration information; the capability file can be a read only file and provides information about the RFID memory 36 memory structure, size version, and the NDEF file control; the NDEF file can be defined by the NFC Forum for use in NDEF tags, the NDEF file can be password protected and used to store user writeable information and includes a messaging protocol. In some embodiments, the RFID memory 36 can be in communication with the host via the host interface 20, said host configured to read or write data to the RFID memory 36. In some embodiments, the RFID memory 36 can be integrated with the memory 24.

Typical RFID memory sizes can range up to 2K bits, with some device providing up to 64K bits of memory or more. In the present embodiment, the smart label 28 and RFID memory 36 are configured to store RFID data, said RFID data comprising data defining a desired programmed configuration of the pluggable transceiver (i.e. pluggable transceiver programming information or data), wherein the RFID data is read from the smart label 28 or RFID memory 36 by the controller 22 and used to program the memory 24 according to the desired operating configuration defined by the data. In an embodiment, the programming information stored in the smart label 28 and RFID memory 36 is at least partially encrypted and can only be decoded by the controller 22 or an external RFID reader 40 configured to do so. Alternatively, the programming information stored in the smart label 28 and RFID memory 36 can be password protected. In an embodiment, the programming information stored in the smart label 28 and RFID memory 36 is encoded with error correcting codes that can be decoded by the controller 22 or an external RFID reader 40 configured to do so.

As can be appreciated, the programming information stored in the smart label 28 tag RFID memory or RFID memory 36 can include at least one of the following programs and/or data, among others:

host interface 20 data defined in an MSA specification, for example identification, diagnostic, control and status data;

host interface 20 data defined in other standard specification, for example identification, diagnostic, control and status data;

host interface 20 data defined in a proprietary specification, for example protocol processor identification, MAC and IP addresses, diagnostic, configuration and status data;

data to configure the pluggable transceiver 10 ICs, for example data to configure an optical-electrical converter 16 receiver and laser driver or an Ethernet electrical transceiver;

data to configure the controller 22 and or protocol processor 18 program parameters, for example data to configure programs executing on the controller 22 or protocol processor 18;

one or more controller 22 programs used to operate the pluggable transceiver 10; and one or more protocol processor 18 programs used to operate the pluggable transceiver 10.

In the illustrated embodiments, the smart label 28 and RFID memory 36 are each configured with a radio frequency interface for transmitting and receiving RF signals in the high frequency ("HF") RFID range, for example 13.56 MHz. The smart label 28 is configured to communicate with the RFID reader 30 using an RFID communications protocol, for example ISO 15693. The RFID memory 36 is configured to communicate with an external RFID reader 40 using an RFID communications protocol, for example ISO 14443 Type A and NFC Forum Type 4 Tag. In other embodiments, the smart label 28 and RFID memory 36 can transmit and receive RF signals in another frequency range such as for example the UHF frequency range. In other embodiments, the RFID memory 36 and smart label 28 can be configured to communicate using other RFID communications protocol such as for example ISO/IEC 18092, ECP global Gen2 (i.e. ISO 18000-6C), Bluetooth, etc.

Figure 3A:
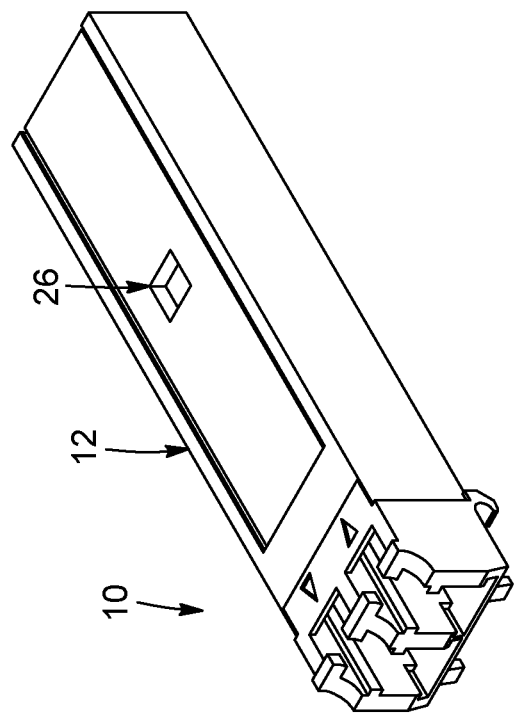
FIG. 3A is an isometric view of an optical pluggable transceiver with an aperture in the housing, according to an embodiment.
Figure 3B:
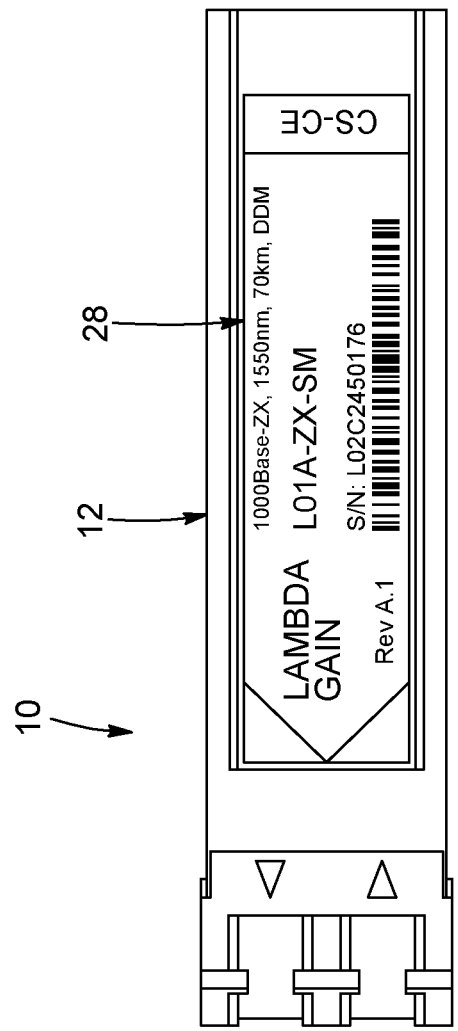
FIG. 3B is a top view of the optical pluggable transceiver of FIG. 3A, with a smart label showing printed information thereon attached to the housing and covering the aperture.

Exemplary isometric and top views of a pluggable transceiver 10 are illustrated in FIGS. 3A and 3B. In the illustrated embodiment, the pluggable transceiver 10 is provided with a housing 12 configured with a designated area on an exterior surface of the housing 12. The designated area is used to attach the smart label 28 or used to position an external RFID reader 40. For example, the area can be an outlined section on an exterior surface of the housing indicating the RF interface, or a section on the exterior surface of the housing sized and shaped to receive the smart label 28 such as a recess, or an outlined section on the surface of the PCBA 32 indicating the RF interface, etc. In the present embodiment, the area includes at least one aperture 26 defined in the housing 12, said aperture 26 being configured to enable RFID communications therethrough, for example to allow RFID signals to travel between an RFID device (such as a smart label or external RFID reader) on an exterior of the housing 12 and an RFID antenna located inside the housing 12. As can be appreciated, in this configuration, the aperture 26 can provide an RF interface for the smart label 28 and/or to an external RFID reader 40. In some embodiments, the designated area can be located on the PCBA 32 and can provide an RF interface for the smart label 28, with said area configured to enable RFID communications therefrom with the RFID antenna 38 and RFID reader 30. In some embodiments, the designated area can be located on the PCBA 32 and provides an RF interface for the external RFID reader 40, said area being configured to enable RFID communications therefrom with the RFID antenna 39 and RFID memory 36. In the present embodiment, the RF interface includes at least one dielectric interface preferably surrounded by an electromagnetically shielding material such as to create a path for RFID communications between an interior and an exterior of the housing 12. Preferably, the dielectric interface is sized and configured to attenuate and/or block unintended electromagnetic waves passing through the interface. In the present embodiment, the dielectric interface comprises air, and is defined by aperture 26 formed in sidewalls of the housing 12. In this configuration, the shielding material surrounding the dielectric interface is the metal forming housing. As can be appreciated, aperture 26 can be sized according to the wavelength of RFID waves used for communication, to effectively act as a filter for allowing the passage of desired wavelengths of electromagnetic radiation. For example, the maximum linear dimension of the aperture can be approximately 6 mm in size, and preferably have an area of less than 29 mm$^2$. Preferably still, aperture 26 is sized to attenuate unwanted signals from passing through, for example by approximately 60 dB or more at 10 GHz. It is appreciated that other dielectric interfaces are also possible. For example, the dielectric interface can comprise plastic which covers aperture 26. In other embodiments, two or more apertures 26 can be provided, each containing a magnetically permeable terminal such as for example a ferrite that together provide an RF interface. As shown in FIG. 3B, when a smart label 28 is affixed to housing 12, the smart label 28 can completely cover aperture 26. In the present embodiment, the smart label 28 includes a body 28 having a top surface, the top surface containing printed information such as for example a product code, serial number, and a barcode. In another embodiment, the smart label 28 can include an electro-magnetic (EM) substrate and adhesive to attenuate electro-magnetic emissions radiating from the aperture 26 when the pluggable transceiver 10 is installed and operating in a host.

Figure 4:
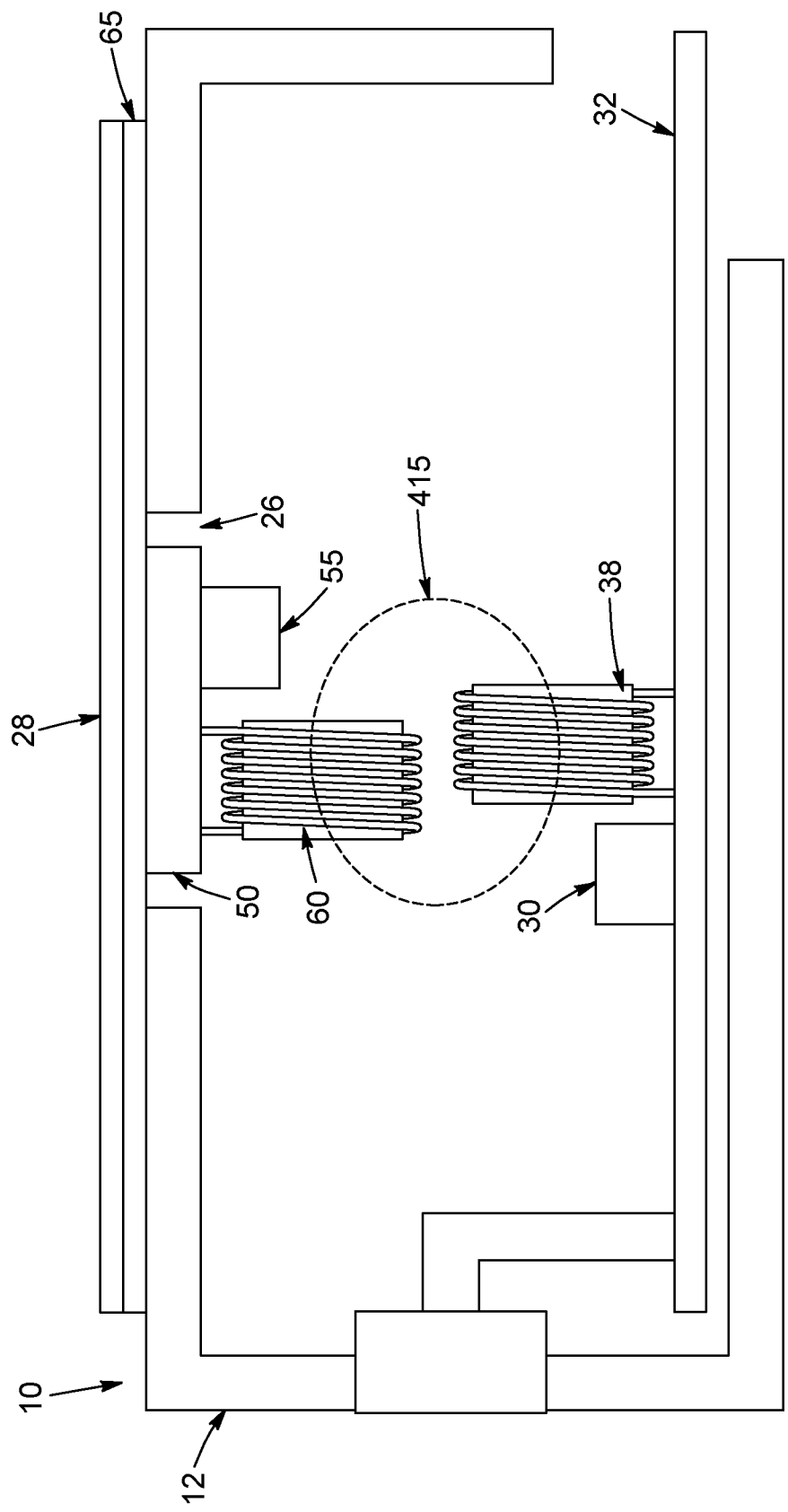
FIG. 4 is a side cutaway profile view of a pluggable transceiver configured with a smart label, according to an embodiment wherein the smart label includes a raised section on a bottom side of the smart label where the tag RFID antenna is located, and the orientation of the smart label's RFID antenna magnetic axis is in the X-Y plane.
Figure 5:
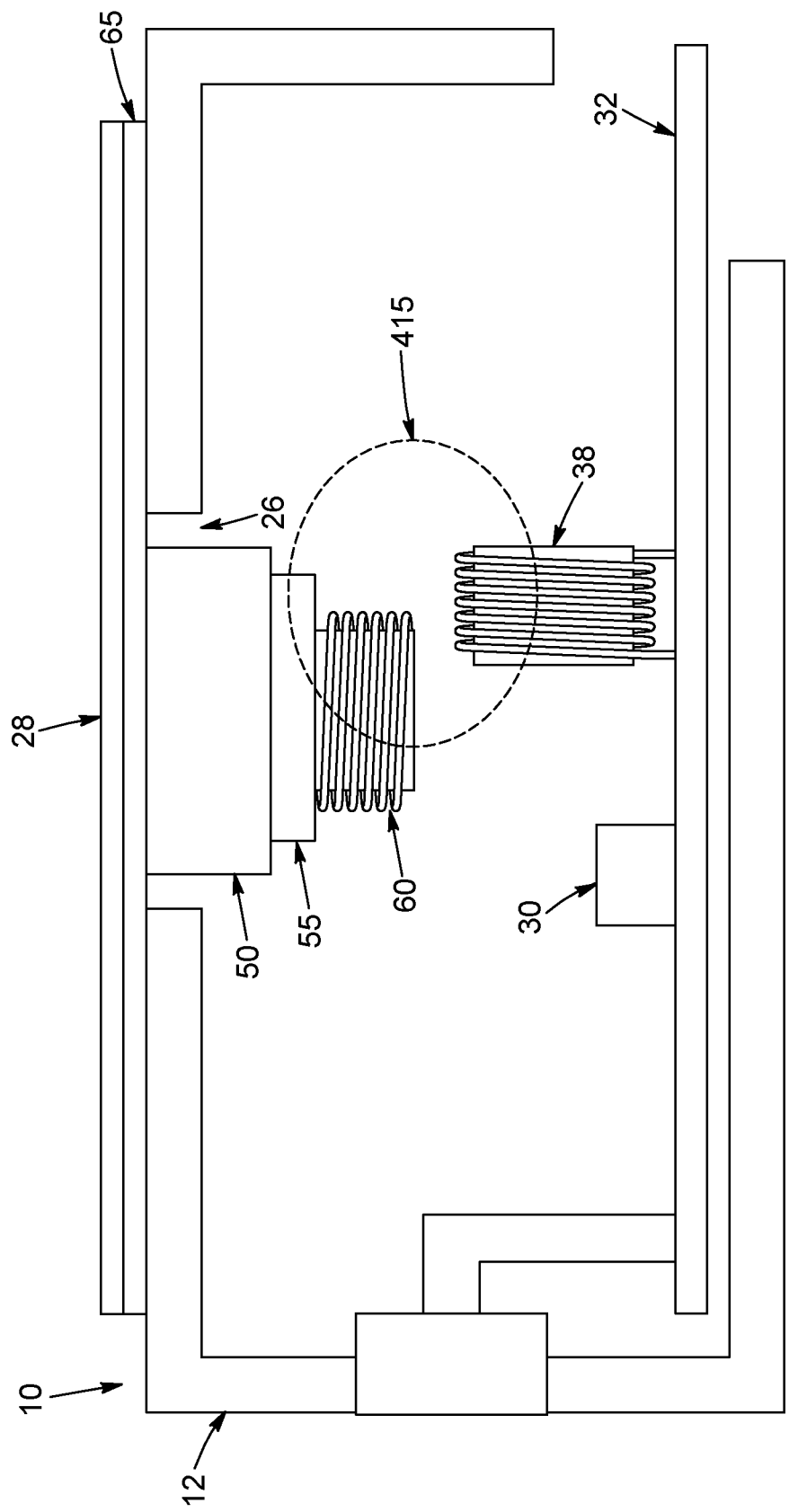
FIG. 5 is a side cutaway profile view of a pluggable transceiver configured with a smart label, according to an embodiment wherein the smart label includes a raised section on a bottom side of the smart label where the tag RFID antenna is located, and the orientation of the smart label's RFID antenna magnetic axis is in the Z plane.

In more detail now, and with reference to FIG. 4 and FIG. 5, the smart label 28 includes: a body 28 having a bottom surface; a fastening mechanism for fastening the smart label 28 bottom surface to the pluggable transceiver 10; and an RFID tag secured to the body 28, the RFID tag including a substrate 50 on which a tag RFID memory 55 and a tag RFID antenna 60 are connected and/or supported. The tag RFID memory 55 has stored thereon data defining a desired programmed configuration (i.e. programming information), the tag RFID memory 55 and RFID antenna 60 being configured to transmit data to an RFID reader 30 located within the pluggable transceiver 10 upon interrogation therefrom. In the illustrated embodiment, the aperture 26 is sized to receive a tag RFID antenna 60 at least partially therethrough.

In the illustrated embodiments, the fastening mechanism comprises an adhesive provided on the bottom surface of the smart label 28 body. In the illustrated embodiments, the smart label 28 includes an electro-magnetic (EM) substrate 65 to attenuate electro-magnetic emissions radiating from the aperture 26. Preferably, the EM substrate 65 is secured to the smart label body 28 and to the RFID tag substrate 50, and the EM substrate 65 preferably comprises an electromagnetically shielding material, such as a conductive adhesive provided on the bottom surface to attach the smart label 28 to the pluggable transceiver 10. For example, the smart label 28 can include an EM substrate configured with electrically conductive material such as an aluminum or copper foil or tape, or magnetically permeable material such as a ferrite sheet or tape and such EM substrate attenuates electromagnetic emissions radiating through the aperture 26. It should be noted that in some embodiments, the smart label does not necessarily include an EM substrate 65.

In the illustrated embodiments, the smart label 28 is configured with a raised area on an underside thereof, the raised area including the RFID antenna 60. The raised area is configured (i.e. sized and positioned) to at least partially protrude through the aperture 26 and inside the housing 12 when the smart label 28 is attached to the housing 12. With the smart label 28 attached to the housing 12, the tag RFID antenna 60 and the RFID antenna 38 are preferably aligned and proximate to each other within the read range. For example, the distance between the tag RFID antenna 60 and an RFID antenna 38 is preferably in a range ("read range") from touching to 5 mm. In some embodiments, the smart label 28 can be configured with the tag RFID antenna 60 and tag RFID memory 55 contained within the body of the smart label 28, and they do not protrude from the top or bottom surface of the body.

Preferably, the tag RFID antenna 60 and/or the RFID antenna 38 are configured to provide optimal magnetic field coupling, for example by selecting an appropriate design, type, magnetic orientation and/or alignment of the antennas. As can be appreciated, such a configuration can enable reliable RFID communications between the tag RFID memory 55 and the RFID reader 30 within the read range. In the present embodiment, the tag RFID antenna 60 and the RFID antenna 38 are configured for resonant inductive coupling. For example, said resonant inductive coupling can enable the near field wireless transmission of electrical energy between magnetically coupled coils, for example coils contained in the tag RFID antenna 60 and the RFID antenna 38, each antenna including a resonant circuit tuned to resonate at the RFID transmitter frequency. With reference to the illustrated embodiments, the PCBA 32 component surface lies on a plane defined as the X-Y plane, and the Z plane is defined as perpendicular to the X-Y plane.

In an embodiment illustrated in FIG. 4, the tag RFID antenna 60 is configured as a coil and located within the read range proximate to the RFID antenna 38, the RFID antenna 38 is configured as a coil surface mounted to the PCBA, the orientation of tag RFID antenna 60 and RFID antenna 38 magnetic axes in the X-Y plane and preferably aligned, the tag RFID antenna 60 preferably centered above the RFID antenna 38. In the embodiment illustrated in FIG. 5, the tag RFID antenna 60 is configured as an inductor coil and located within the read range proximate to the RFID antenna 38, the RFID antenna 38 configured as a coil surface mounted to the PCBA, the orientation of tag RFID antenna 60 magnetic axis in the Z plane, the orientation of RFID antenna 38 magnetic axis in the X-Y plane, the tag RFID antenna 60 preferably partially off-set from centered above the RFID antenna 38. In the illustrated embodiments, the magnetic field 415 couples tag RFID antenna 60 and RFID antenna 38.

In some embodiments, the orientation of RFID antenna 38 magnetic axes can be the Z plane. In some embodiments, the tag RFID antenna 60 and the RFID antenna 38 can be configured as an inductor coil having a ceramic or ferrite core material. In other embodiments, the tag RFID antenna 60 and/or the RFID antenna 38 can be configured with other coil structures, such as spiral or loop or coil shaped structures embedded, printed or etched on a solid or flexible substrate or PCBA, for example RFID antenna 38 can be a printed spiral coil on PCBA 32 located proximate the host interface 20 edge connector.

Preferably, the smart label 28 is attached to a designated area (i.e. the RF interface) on a PCBA 32 within the read range proximate to the RFID antenna 38, the tag RFID antenna 60 configured as a coil, the RFID antenna 38 configured as a spiral or loop or coil shaped structure printed or etched on the surface of the PCBA 32 and at least partially contained by the designated area, the orientation of tag RFID antenna 60 and RFID antenna 38 magnetic axes in the Z plane, the tag RFID antenna 60 preferably centered above RFID antenna 38.

It should be noted that in other embodiments, the tag RFID antenna 60 and or the RFID antenna 38 may have other orientations and or configurations, for example other antenna types, operating frequency and/or coupling technology, such as using UHF based RF technology. In other embodiments, the tag RFID antenna 60 and/or the RFID antenna 38 coil sizes can be increased to increase the read range. As can be appreciated, the magnetic coupling can depend to a large extent on the relative sizes of the coils at the transmitter and receiver.

Although FIGS. 4 and 5 illustrate pluggable transceivers programmable via smart labels, it is appreciated that pluggable transceivers can also be programmed via other RFID devices, such as via an external RFID reader 40, for example as illustrated in the embodiments of FIG. 6, FIG. 7, FIG. 8, FIG. 9, and FIG. 10. In the illustrated embodiments, the external RFID reader 40 can include a memory having stored thereon data defining a desired programmed configuration, with the external RFID reader 40 being configured to transmit data to the RFID memory 36. The external RFID reader can also include a controller for controlling operation of the external RFID reader 40, with the controller being configured to write the data to an RFID memory 36 located proximate to the external RFID reader 40. In an embodiment, the external RFID reader 40 is configured to read data from said RFID memory 36 and store the data in its memory, the external RFID reader 40 being configured to transmit and receive pluggable transceiver data from a remote management system or database via a network. It should be noted that the external RFID reader 40 may be any device configured with an appropriate RFID interface for reading and/or writing to an RFID device, such as an RFID antenna. For example, the RFID reader 40 can be a smartphone device.

Figure 6A:
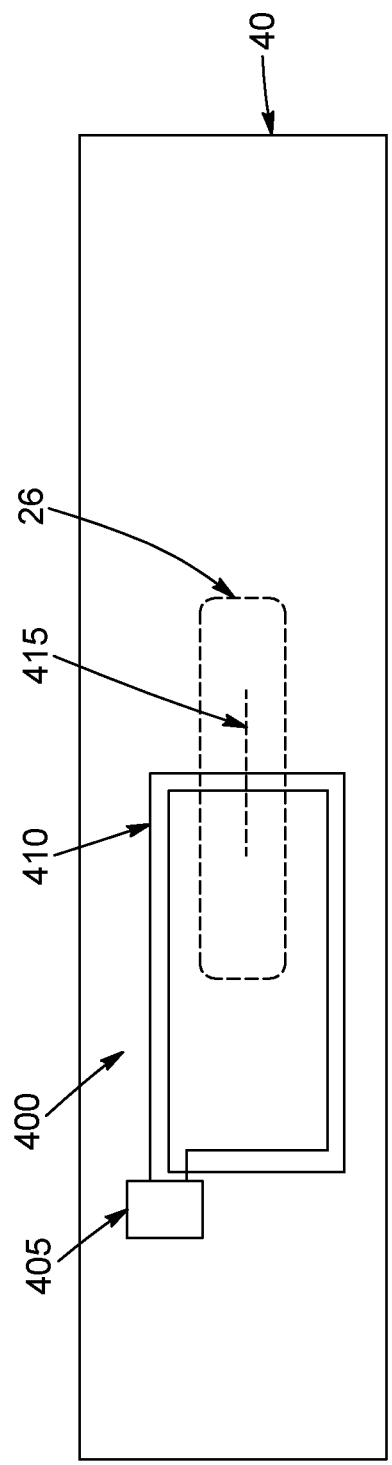
FIG. 6A is a bottom cutaway view of an external RFID reader and RFID antenna according to an embodiment.
Figure 6B:
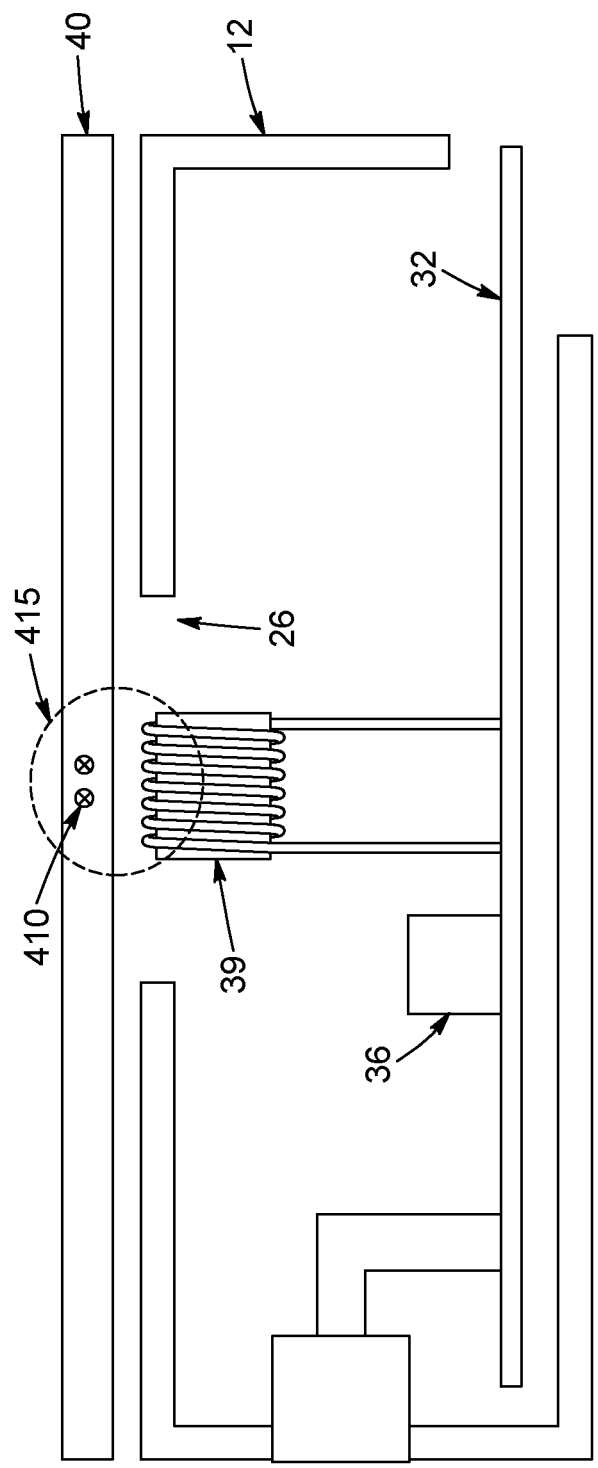
FIG. 6B is a side cutaway profile view of the external RFID reader of FIG. 6A positioned above the housing and aperture of a pluggable transceiver, according to an embodiment wherein the RFID antenna is mounted in the aperture and not protruding from the housing.

In the embodiment illustrated in FIG. 6, the external RFID reader 40 is configured with a reader RFID antenna 400 which can be positioned above the housing 12 aperture 26 (e.g. positioned over the RF interface), preferably such that the reader RFID antenna 400 traces 410 and the RFID antenna 39 are aligned and proximate to each other within the read range. For example, the distance between the reader RFID antenna 400 and the RFID antenna 39 is preferably in a range from touching to 3 mm. The RFID memory 36 is adapted to store thereon data defining a desired programmed configuration, the RFID memory 36 and RFID antenna 39 configured to receive the data from the external RFID reader 40 upon interrogation therefrom. In the illustrated embodiment, the aperture 26 is sized to receive the RFID antenna 39 at least partially therein, the RFID antenna 39 not protruding from the housing 12 exterior surface. In another embodiment, the aperture 26 can be sized to receive the RFID antenna 39, the RFID antenna 39 at least partially protruding from the housing 12 exterior surface. In another embodiment, the RFID antenna 39 can be detachably connected to the PCBA, the RFID antenna 39 at least partially protruding from the housing 12 exterior surface, for example the RFID antenna can be mounted on a connector and the connector temporarily installed on the MSA host interface edge connector on the PCBA 32 during programming. In an embodiment, the RFID memory 36 and RFID antenna 39 can be configured to transmit pluggable transceiver 10 information data to the external RFID reader 40 upon interrogation therefrom.

Preferably, the design, type, magnetic orientation and/or alignment of the reader RFID antenna 400 and the RFID antenna 39 are selected to provide an optimal magnetic field coupling between the reader RFID antenna 400 and the RFID antenna 39, wherein such coupling enables reliable RFID communications between the external RFID reader 40 and the RFID memory 36 within the read range. In the present embodiment, the RFID antenna 39 is configured for resonant inductive coupling. FIG. 6 illustrates the coupling mechanism between the reader RFID antenna 400 and RFID antenna 39 according to an embodiment, said coupling mechanism also used in the embodiments illustrated in FIG. 7, FIG. 8, FIG. 9, and FIG. 10, wherein the reader RFID antenna 400 and RFID antenna 39 are coupled via the magnetic field 415 generated by a RFID transceiver feeding port 405 or a primary RFID antenna feeding port 405 of the RFID antenna 400. Said coupling mechanism is structured to maximize the field directly under the conductive traces excited by the alternating current of the antenna wire or trace 410. This near-field coupling approach can allow the communication to cross through the metallic barrier (e.g. housing) via the slot aperture 26. Traces 410 may be made thinner or denser near the aperture 26 such as to improve the field intensity. Elsewhere in the planar loop the conductive traces may be kept wider such as to reduce the resistive losses in the antenna traces 410 in the overall loop. It should be noted that multiple variants of the resonant structure are possible depending on the location of aperture 26, in addition, the proposed configurations are representative illustrations of the coupling mechanism. As can be appreciated, although aperture 26 is illustrated as being provided on sidewalls of housing 12, the aperture can be located elsewhere, such as on a face plate of the pluggable transceiver 10. Similarly, although RFID antenna 39 is shown as being positioned proximate to sidewalls of housing 12, it is appreciated that antenna 39 can be positioned elsewhere, such as proximate to a face plate of the pluggable transceiver 10 and/or protruding from faceplate.

In the embodiment illustrated in FIG. 6, the external RFID reader 40 RFID antenna 400 is configured as a coil, the RFID antenna 39 is configured as a coil mounted proximate in the aperture and not protruding from the housing 12 exterior surface, the RFID antenna 39 is electrically connected to the PCBA 32, the orientation of external RFID reader 40 is preferably in the X-Y plane, the orientation of RFID antenna's 39 magnetic axis is in the X-Y plane, and the reader RFID antenna 400 wires 410 are preferably centered above RFID antenna 39. It should be noted that practical considerations may affect the preferred alignment and proximity of the antennae, and an external field-concentrating RFID repeater can be used to facilitate proper alignment to enable reliable communications between the external RFID reader 40 and the RFID antenna 39, for example using the external RFID repeater shown in FIG. 9 and FIG. 10. In an embodiment, the RFID antenna 39 is configured as an inductor coil having a ceramic or ferrite core material. In other embodiments, the RFID antenna 39 can be configured with other coil structures, for example spiral or loop or coil shaped structures embedded, printed or etched on a solid or flexible substrate or PCBA, or an inductor coil mounted on a cable or on extended metal leads, and connected to the PCBA 32. It should be noted that in other embodiments, the RFID antenna 39 can have other orientations and or configurations, for example another antenna type, operating frequency and/or coupling mechanism such as a UHF RF antenna. In other embodiments, the tag RFID antenna 60 and or the RFID antenna 38 coil sizes can be increased to increase the read range.

In some embodiments, an electro-magnetic (EM) substrate 65 can be attached to the housing 12 after programming the RFID memory 36, preferably completely covering aperture 26, to attenuate electro-magnetic emissions radiating through the aperture 26, for example to attenuate EM emissions occurring when the pluggable transceiver 10 is installed and operating in a host. The EM substrate 65 can include a conductive adhesive provided on the bottom surface to attach the EM substrate 65 to the pluggable transceiver 10. For example, the EM substrate can be configured with electrically conductive material such as an aluminum or copper foil or tape, or magnetically permeable material such as a ferrite sheet or tape. As can be appreciated, such EM substrate can attenuate electromagnetic emissions radiating through the aperture 26. It should be noted that such EM substrate 65 could be implemented using a smart label 28 as described above, or as a regular label which simply comprises an EM substrate without an RFID tag (e.g. with or without printed information).

Figure 7:
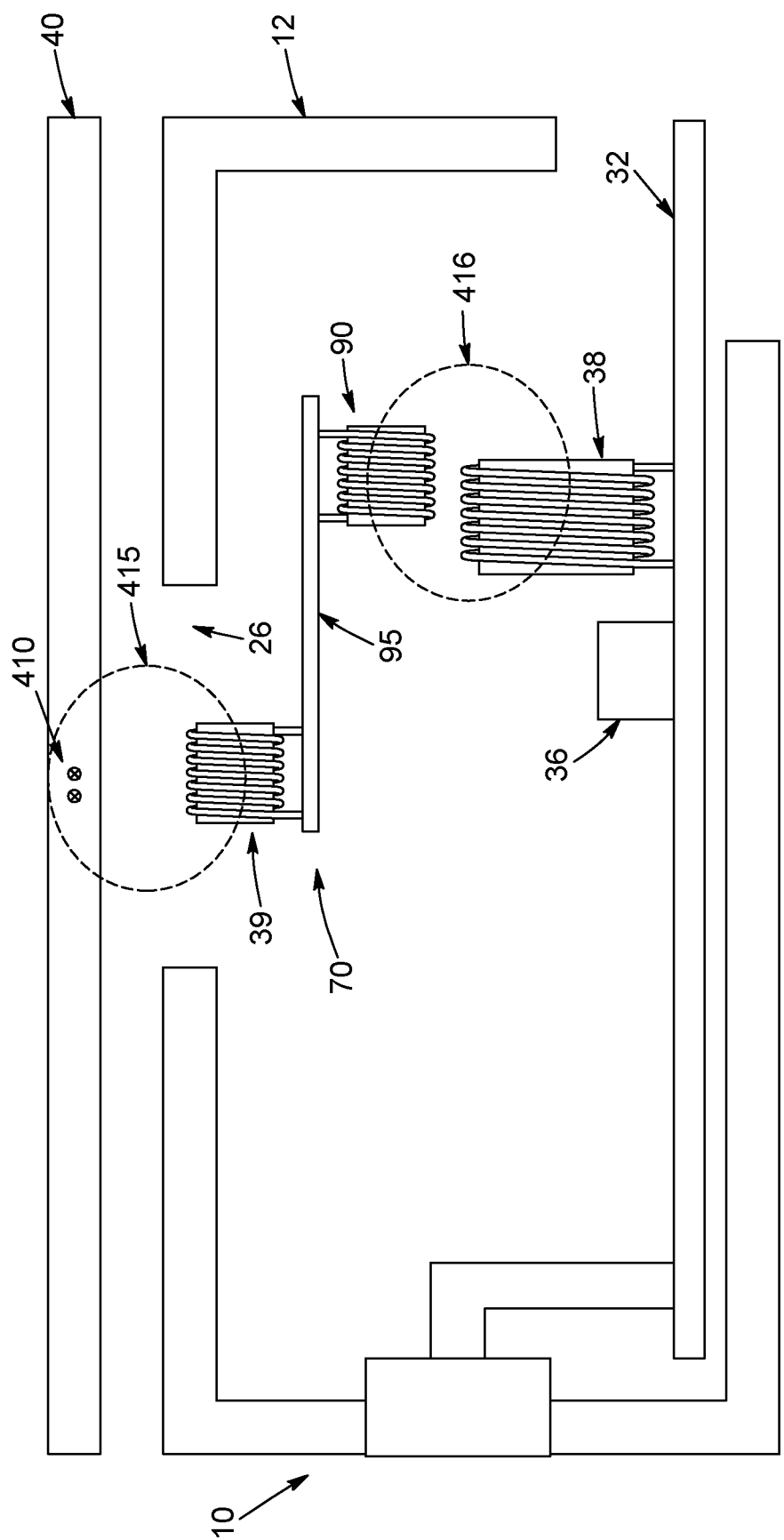
FIG. 7 is a side cutaway profile view of a pluggable transceiver and an external RFID reader according to an embodiment wherein the pluggable transceiver includes an internal RFID repeater.
Figure 8:
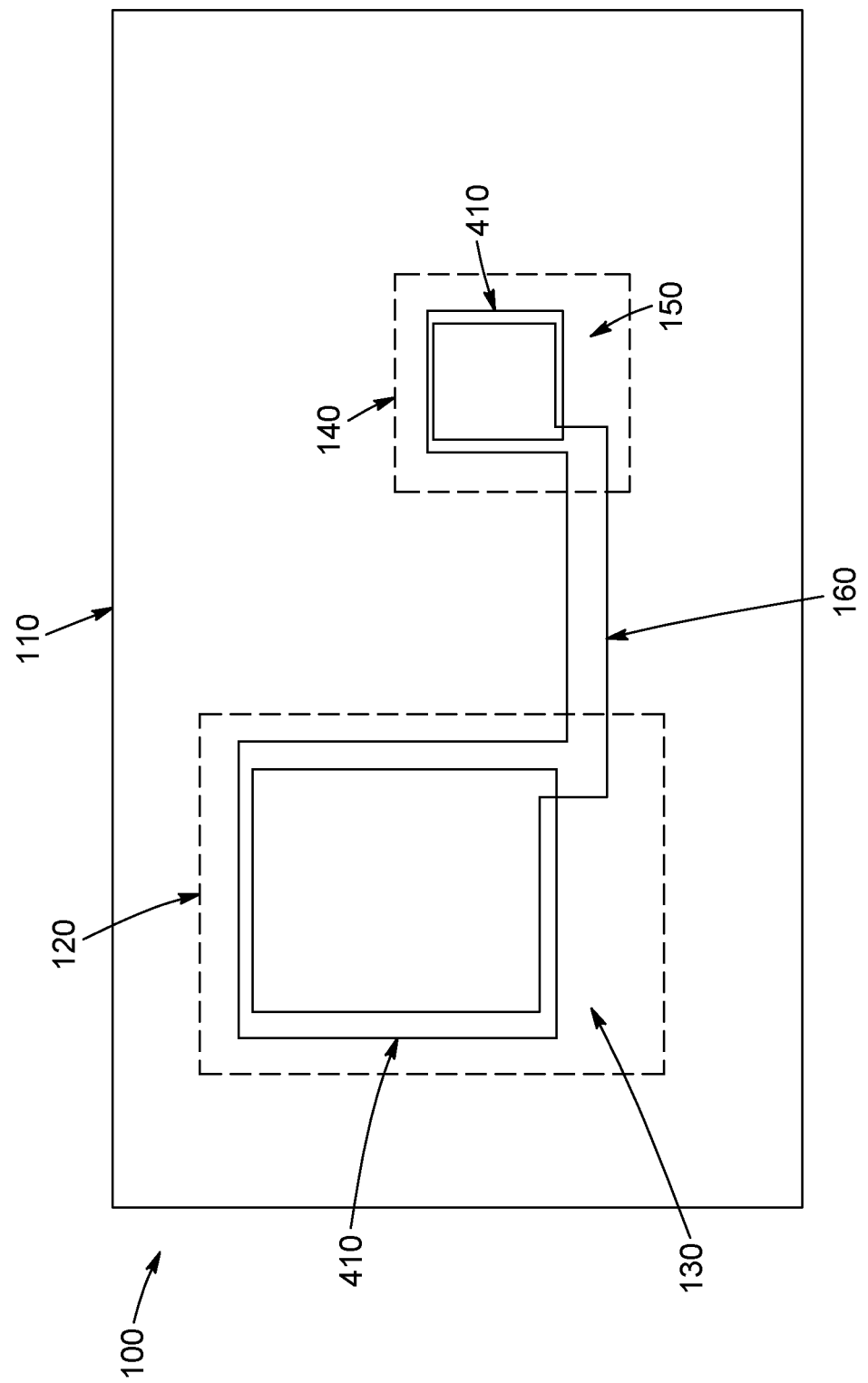
FIG. 8 is a top plan view of an external field-concentrating RFID repeater and antenna circuits, according to an embodiment.

In the embodiment illustrated in FIG. 7, an internal RFID repeater 70 is used to passively relay RFID communications between the external RFID reader 40 and the RFID memory 36. The internal RFID repeater 70 is mounted to an interior of the housing 12 or PCBA 32 and includes: a first internal RFID antenna 39; a second internal RFID repeater antenna 90; and an electrical interconnection 95 between said first and second internal repeater antennae to enable RFID communications therethrough. The external RFID reader 40 antenna wires 410 are preferably positioned within the read range proximate to the internal repeater RFID antenna 39, the internal repeater RFID antenna 39 being configured as a coil mounted proximate in the aperture and not protruding from the housing 12 exterior surface, and the second internal repeater RFID antenna 90 being configured as a coil positioned proximate to the RFID antenna 38 within the read range. Preferably, the two internal repeater RFID antennae coils are interconnected with an electrical interconnection 95 to enable RFID communications between the external RFID reader 40 and the RFID antenna 38 therethrough. The RFID antenna 38 can be surface-mounted and electrically connected to the PCBA 32. The orientation of external RFID reader 40 is preferably in the X-Y plane, the orientation of the internal repeater RFID antenna 39 and the internal repeater RFID antenna 90 and the RFID antenna 38 magnetic axes are preferably in the X-Y plane and aligned, the external RFID reader 40 antenna wires 410 are preferably centered above proximate to the internal repeater RFID antenna 39, and the internal repeater RFID antenna 90 are preferably centered above proximate to the RFID antenna 38. In the illustrated embodiment, the magnetic field 415 couples the external RFID reader 40 antenna wires 410 and internal repeater RFID antenna 39, and the magnetic field 416 couples the internal repeater RFID antenna 90 and the RFID antenna 38. It should be noted that practical considerations may affect the preferred alignment and proximity of the antennae, and an external field concentrating RFID repeater can be used to facilitate proper alignment. In an embodiment, the internal repeater RFID antenna 39 coil and internal repeater RFID antenna 90 coil are electrically connected to each other using an electrical interconnection 95, for example the electrical interconnection can be electrical circuits printed or etched on a flexible substrate or on a PCBA, or a cable assembly, etc. In an embodiment, the internal repeater RFID antenna 39, internal repeater RFID antenna 90 and the RFID antenna 38 are configured as an inductor coil having a ceramic or ferrite core material. In other embodiments, the RFID antenna 38, internal repeater RFID antenna 39 and internal repeater RFID antenna 90 can be configured with other coil structures, for example spiral or loop or coil shaped structures embedded, printed or etched on a solid or flexible substrate or on a PCBA. It should be noted that in other embodiments, the RFID antenna 38, internal repeater RFID antenna 39 and internal repeater RFID antenna 90 may have other orientations and/or configurations, for example another antenna type, operating frequency and/or coupling technology such as a UHF RF antenna. In other embodiments, the internal repeater RFID antenna 39, internal repeater RFID antenna 90 and the RFID antenna 38 coil sizes can be increased to increase the read range. In an embodiment, the internal RFID repeater 70 can include a passive component configured to ensure antenna resonance matching. In an embodiment, the passive component is constructed using the same substrate and conductive material of the antenna structures. A person of reasonable skill in the art will understand that the coupled antennas can be used to re-direct and realign the external magnetic fields of the RFID communications path to the internal antenna of the pluggable transceiver RFID subsystem and thus the above examples are not an exhaustive list of the possible configurations.

Figure 9:
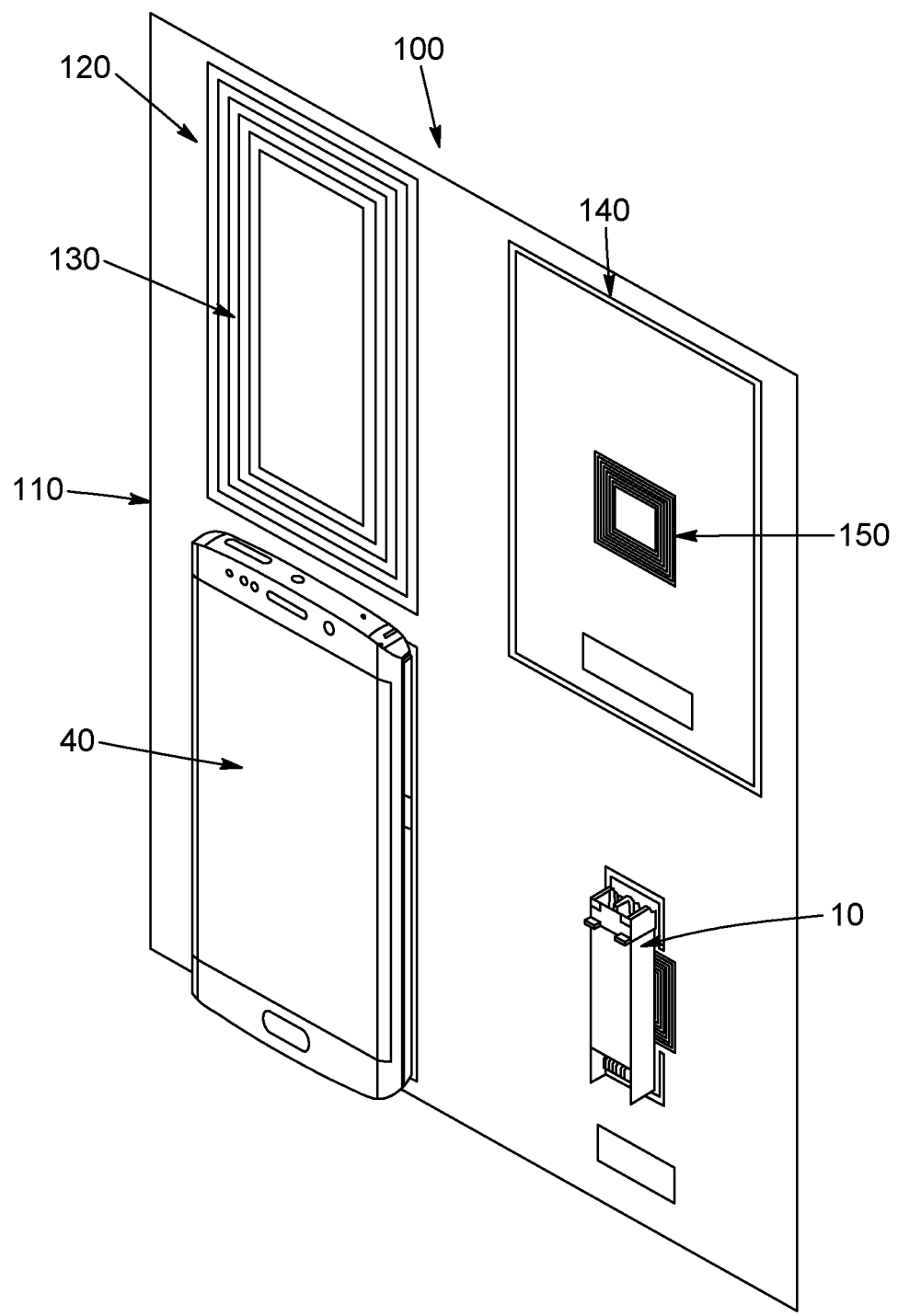
FIG. 9 is an isometric view of a SFP/QSFP external field-concentrating RFID repeater with a smartphone external RFID reader and an SFP transceiver, according to an embodiment.

In some embodiments, wherein due to the presence of shielding material in the housing 12 mechanical structure, the reader RFID antenna 400 and RFID antenna 39 may not be coupled with a direct broadside magnetic coupling as illustrated in FIG. 6. In such embodiments, an external RFID repeater 100 illustrated in FIG. 8 can be used to couple the pluggable transceiver 10 RFID antenna 39 and the external RFID reader 40 RFID antenna 400. In the embodiment illustrated in FIG. 8, the transceiver programming system includes: an external RFID reader 40; a pluggable transceiver 10; and an external RFID repeater 100. For example, the external RFID repeater 100 can concentrate and couple magnetic fields, and passively relay RFID communications between an external RFID reader 40 and the RFID antenna 39 to facilitate programming the pluggable transceiver 10 using an external RFID reader 40. In the present embodiment, the external RFID repeater 100 is configured with at least one substrate 110 that includes: a printed circuit assembly, the printed circuit assembly containing: a first outlined surface area 120 used to locate an external RFID reader 40, the first surface area 120 containing a field-concentrating repeater RFID antenna 130 coil and configured to interface with an external RFID reader 40; a second outlined surface area 140 to locate a pluggable transceiver 10, the second surface area 140 containing a field-concentrating repeater RFID antenna 150 coil and configured to interface with a pluggable transceiver 10; and an electrical connection 160 between the repeater RFID antenna 130 coil and the repeater RFID antenna 150 coil; wherein the repeater RFID antenna 130 and the repeater RFID antenna 150 are interconnected to enable RFID communications between an external RFID reader 40 and a pluggable transceiver 10 therethrough. FIG. 9 illustrates an isometric view of a dual SFP and QSFP pluggable transceiver 10 external field-concentrating RFID repeater 100 according to an embodiment, including an external field-concentrating RFID repeater 100 with a smartphone external RFID reader 40 and an SFP pluggable transceiver 10 located over their corresponding repeater RFID antennae.

In other embodiments, the repeater RFID antenna 130 and repeater RFID antenna 150 can be configured with other coil structures, for example a spiral or loop or coil shaped structure printed or etched on a solid or flexible substrate or on a PCBA, or a coil inductor, etc. It should be noted that in other embodiments, first external repeater RFID antenna 130 and second external repeater RFID antenna 150 can have other orientations and/or configurations, for example another antenna type, operating frequency and/or coupling technology such as a UHF RF antenna. In some embodiments, the external RFID repeater 100 can include: an external RFID reader substrate with an outlined surface area 120, such surface area 120 containing a repeater RFID antenna 130 coil configured to interface with the external RFID reader 40, such repeater RFID antenna 130 configured to connect to a cable (e.g. a detachable or nondetachable connection); a pluggable transceiver substrate with an outlined surface area 140, such surface area 140 containing a repeater RFID antenna 150 coil configured to interface with a pluggable transceiver 10, such repeater RFID antenna 150 configured connect to a cable; and an interconnecting cable; wherein the first repeater RFID antenna 130 and second repeater RFID antenna 150 are interconnected to enable RFID communications between an external RFID reader 40 and a pluggable transceiver 10 therethrough. In some embodiments, the outlined surface area can be sized to fit the mechanical outline of an MSA or other pluggable transceiver 10 housing dimensions. A person of reasonable skill in the art will understand that the coupled antennas are used to re-direct and realign the external magnetic fields of the RFID communications path to the internal antenna of the pluggable transceiver RFID subsystem and thus the above examples are not an exhaustive list of the possible configurations.

Figure 10:
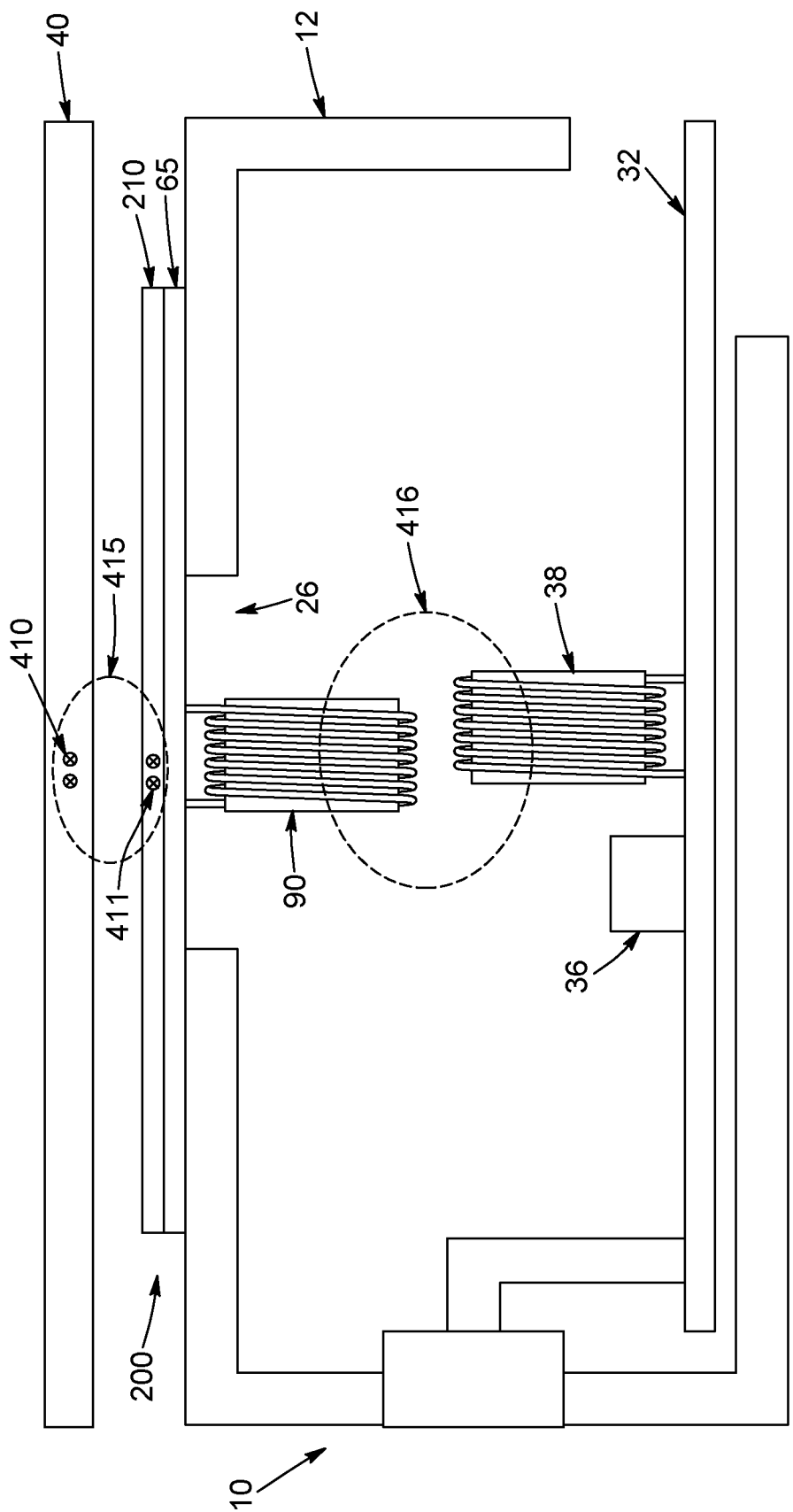
FIG. 10 is a side cutaway profile view of a pluggable transceiver and an external RFID reader according to an embodiment in which the pluggable transceiver includes an internal/external field-concentrating RFID repeater.

In the embodiment illustrated in FIG. 10, an internal/external RFID repeater 200 is used to passively relay RFID communications between an external RFID reader 40 and the RFID antenna 38. The internal/external RFID repeater 200 is mounted to an exterior of the housing and includes: a substrate 210 containing a first external field-concentrating RFID antenna; a second internal RFID repeater antenna 90 mounted to on an underside of said substrate; and a connection between the first and second repeater antennae to enable RF communications therethrough. The external RFID reader 40 antenna is positioned proximate to the external repeater RFID antenna 210 within the read range, the external repeater RFID antenna 210 being configured as a coil mounted on an exterior of the housing 12 over the aperture 26, the internal repeater RFID antenna 90 being configured as a coil positioned through the aperture 26 proximate to the RFID antenna 38 within the read range; wherein the two internal/external repeater RFID antenna coils are interconnected to enable RFID communications between the external RFID reader 40 and the RFID antenna 38 therethrough. The RFID antenna 38 coil is surface mounted and electrically connected to the PCBA 32. The orientation of external RFID reader 40 is preferably in the X-Y plane, the orientation of the external repeater RFID antenna 210 magnetic axes is preferably in the Z plane, the orientation of the internal repeater RFID antenna 90 and the RFID antenna 38 magnetic axes are preferably in the X-Y plane, the external RFID reader 40 RFID antenna is preferably centered above the internal/external repeater RFID antenna 210, and the internal/external repeater RFID antenna 220 is preferably centered above and proximate to the RFID antenna 38. In the illustrated embodiment, the magnetic field 415 couples the external RFID reader 40 antenna wires 410 and external repeater RFID antenna wires 411, and the magnetic field 416 couples the internal repeater RFID antenna 90 and the RFID antenna 38.

In the illustrated embodiment, the internal/external RFID repeater 200 substrate includes an external RFID antenna 210 built in a planar structure and contains an EM substrate 65, for example a layer of ferromagnetic material that minimizes the effects of a metallic housing 12 on the coupling field, the EM substrate 65 being configured improve the magnetic coupling between the external RFID reader 40 and the external RFID antenna 210, for example by preventing eddy currents from forming on the metal housing, the EM substrate 65 also attenuating unintended electro-magnetic emissions radiating from the aperture 26, the EM substrate 65 being secured to an underside of the external RFID antenna 210 substrate, wherein the EM substrate 65 includes a conductive adhesive provided on the bottom surface to attach the internal/external RFID repeater 200 to the pluggable transceiver 10. In an embodiment, the internal/external RFID repeater 200 substrate is a solid or flexible substrate such polymide or PET containing a printed or etched circuit, the external repeater RFID antenna 210 is configured with a printed coil or loop or spiral structure on said substrate, the internal repeater RFID antenna 220 is configured as inductor coil having a ceramic or ferrite core material, and the external repeater RFID antenna 210 coil and the internal repeater RFID antenna 90 coil are interconnected with a circuit printed or etched on said substrate. It should be noted that in other embodiments, the RFID antenna 38, first external repeater RFID antenna 210 and second internal repeater RFID antenna 90 can have other orientations and or configurations, for example another antenna type, operating frequency and/or coupling technology such as a UHF RF antenna. In other embodiments, the external repeater RFID antenna 210 and internal repeater RFID antenna 90 and the RFID antenna 38 coil sizes can be increased to increase the read range. In an embodiment, the internal/external RFID repeater 200 includes a passive component configured to ensure antenna resonance matching. In an embodiment, the passive component is constructed using the same substrate and conductive material of the antenna structures. A passive element or the use of the conductive layers separated by the substrate dielectric can be added to adjust the resonant structure of the repeater. A person of reasonable skill in the art will understand that the coupled antennas are used to re-direct and realign the external magnetic fields of the RFID communications path to the internal antenna of the pluggable transceiver RFID subsystem and thus the above examples are not an exhaustive list of the possible configurations. In another embodiment, the external repeater RFID antenna 210 can be configured with electrical wiring or cabling or connector, said wiring or cabling or connector being connected to the PCBA 32 with the external repeater RFID antenna 210 being connected to the RFID memory 36 to enable RFID communications therethrough, for example the internal repeater RFID antenna 90 and RFID antenna 38 are not required in this configuration to support RFID communications between the external RFID reader 40 and the RFID memory 36.

In the illustrated embodiments, electrically conductive components or parts of the housing 12 (e.g. metal or metallic parts) are generally connected to an electrical ground point, wherein the pluggable transceiver 10 and housing 12 are connected to ground when installed in a host. It should be noted that in some embodiments, the metallic components and parts affect the RF signal propagation. In addition, the PCBA 32 may contain other IC components and or materials that also affect the RF signal propagation. Consequently, the housing 12 and or PCBA 32 are preferably adapted where necessary to minimize interference from metallic components or parts to enable RF signals radiating from the RFID antenna 38 or RFID antenna 39 to couple with the tag RFID antenna 60 or external RFID reader 40 respectively. In an embodiment, the housing 12 and or PCBA 32 can be adapted with a ferrite material to minimize the effect of said components, parts and materials on the RFID antenna coupling.

In some embodiments, the housing 12 can be configured to detachably connect to a host, for example as specified in an MSA, and the housing 12 and smart label 28 can be physically configured to enable the pluggable transceiver 10 and attached smart label 28 or internal/external RFID repeater 200 to be installed in a host pluggable transceiver port, for example installed in a standard MSA SFP cage assembly of a host Ethernet switch.

Preferably, controller 22 comprises a program executing thereon (hereinafter referred to as the "programming manager") that programs, configures and/or reads the memory 24 using programming information or data stored in an RFID memory, for example stored in RFID memory 36 or tag RFID memory 55. In some embodiments, for example as illustrated in FIG. 1, the memory 24 is programmed when the pluggable transceiver 10 configured with a smart label 28 containing pluggable transceiver programming information or data is installed and powered up, wherein during the controller 22 initialization (e.g. the process of booting, loading and starting the operating system and or application program, IC programming/configuration, etc.) the programming manager invokes the RFID reader 30 to read the data stored in the smart label 28 tag RFID memory 55, and programs the memory 24 according to the desired operating configuration defined by the data read from the smart label 28 tag RFID memory 55. In other embodiments, for example as illustrated in FIG. 2, the pluggable transceiver 10 can be configured with an RFID memory 36, the RFID memory 36 being programmed with programming information (e.g. data) using an external RFID reader 40 prior to installing the pluggable transceiver 10 in the host, the memory 24 is programmed when the pluggable transceiver 10 is installed and powered up, wherein during the controller 22 initialization the programming manager reads the data stored in the RFID memory 36, and programs the memory 24 according to the desired operating configuration defined by the data read from the RFID memory 36.

In the embodiments described above, the programming manager executing during said initialization processes the data read from the smart label 28 tag RFID memory 55 or RFID memory 36, and such data provides the operating set-up necessary for the programming manager to program the memory 24, and the programming manager automatically programs the memory 24 using such data. Once the memory 24 has been programmed using such data and the controller 22 initialization is complete, the pluggable transceiver 10 is ready for service and can be said to be in a desired operating configuration (i.e. a programmed configuration). For example, the programming manager can program the pluggable transceiver 10 memory 24 according to the desired operating configuration defined by the data read from the RFID memory 36, wherein the data is used to program and or configure at least one the following (among others):

host interface 20, for example to configure an MSA and or other standard and or proprietary host interface 20 memory map data fields with data;

network interface 14, for example to configure the optical transmission wavelength of the optical-electrical converter 16 to a specific wavelength;

pluggable transceiver 10 ICs, for example programming the configuration registers of a laser driver and receiver amplifier ASIC with data;

memory 24, for example programming the memory 24 with program initialization data used to configure a controller 22 and or protocol processor 18 program stored in memory 24, such as data to initialize an operating system, or for example programming the memory 24 with a program configured to execute on a controller 22 and or protocol processor 18; and a program executing on the controller 22, for example to direct a program executing on the controller 22 to read specific data stored in memory 24.

In an embodiment, the RFID data used to program the memory 24 includes one or more memory address, said memory addresses pointing to one or more programs and/or data stored in memory 24, for example said programs and/or data can be pre-programmed in the memory 24 during the manufacturing process or when installed in a host. In an embodiment, the memory 24 is configured with a plurality of programs and/or data, and said programs and/or data are executed by a controller 22 and/or a protocol processor 18 using the memory address stored in memory 24. In an embodiment, the programming manager reads the RFID data stored in the smart label 28 or RFID memory 36, and programs the memory 24 with the memory address provided in the RFID data, wherein a program running on the controller 22 reads the memory address from memory 24 and executes a program stored in memory 24 using said memory address, and thereby programs the pluggable transceiver 10 according to the desired operating configuration defined by the RFID data. In an embodiment, the programming manager reads the memory address stored in the smart label 28 or RFID memory 36, and programs the memory 24 with the memory address, wherein a program running on the controller 22 reads the memory address from memory 24 and reads data stored in memory 24 using said memory address defined by the RFID data, and thereby programs the pluggable transceiver 10 according to the desired operating configuration defined by the RFID data. For example, memory 24 can be configured with a plurality of programs and/or data during the manufacturing process, said programs and/or data enabling the pluggable transceiver 10 to provide a plurality of network and/or management operating configurations. For example, the pluggable transceiver 10 can be an SFP providing NID functionality and a CLI management interface, or an SFP providing MPLS packet gateway functionality and a Web GUI management interface. As can be appreciated, the programming manager can read the RFID data from the smart label 28 or RFID memory 36 and program the memory 24 with the memory address defined by the RFID data, the controller 22 can read the memory address from memory 24 during the initialization process and execute a program stored in memory 24, and/or can read data from memory 24 using the memory address or addresses read from the RFID memory. In another example, the memory address read from the RFID memory can be used to select, load, read, and/or index a host interface 20 memory map (e.g. standard MSA QSFP+ memory map, data fields and values) stored in memory 24. In an embodiment, the RFID data stored in the RFID memory can be configured with at least one memory address or identifier, wherein the memory address or identifier is used by controller 22 and/or protocol processor 18 to perform at least one of the following using programs and/or data preprogrammed in the memory 24:

execute a boot program;
execute an operating system program;
execute protocol processor 18 program;
program a protocol processor using data;
execute an application program stored;

select or load or read or index a host interface 20 or network interface 14 management information data (e.g. a data field and value defined in an MSA host interface);

move or copy programs and or data to or from the memory 24; and move or copy programs and or data from a network address location, for example programs and data stored in a remote management system connected to a network, to the memory 24.

In the present embodiment, the programming manager configured to only program the memory 24 when the pluggable transceiver 10 is powered up and first initialized with the smart label 28 or RFID memory 36 programming information data, wherein such programming manager not programming the memory 24 using said programming information data in subsequent controller 22 initializations. In an embodiment, the programming manager stores the programming information data read from the RFID memory in memory 24 during said first initialization. For example, based on this programming method, after a pluggable transceiver 10 is first initialized with the smart label 28 and its memory 24 programmed to the desired operating configuration defined by the data the pluggable transceiver 10 is ready for service once said initialization is completed, subsequently, when the host configures the memory 24 with a new operating configuration (e.g. to change threshold parameter settings) via the host interface 20 thereby changing the programmed operating configuration, such new operating configuration will not be overwritten by the programming manager with the desired operating configuration on subsequent controller 22 initializations. For example, the programming manager can determine that a current programmed configuration corresponds to a programmed configuration defined by the smart label, even if some parameters have been altered, if it is determined that the programmed configurations correspond, the programming manager will not overwrite the programmed configuration of the transceiver 10.

In the present embodiment, if the programming manager cannot obtain the programming information, the programming manager programs the pluggable transceiver 10 to operate in a pre-determined or default service mode or operational state, for example in one embodiment the pluggable transceiver 10 default programmed configuration is disabled or in another embodiment the pluggable transceiver 10 operates using a default host interface 20 memory map, data fields and values stored in memory 24 or in another embodiment the controller 22 is initialized using default programs and data stored in memory 24, etc.

In another embodiment, the smart label 28 or RFID memory 36 is read during every controller 22 initialization and the programming information read from the smart label 28 or RFID memory 36 processed by the programming manager to determine the state of said programming information, for example not installed, installed, changed, failed, invalid, missing, etc. and update the programmed configuration of the pluggable transceiver 10 accordingly. In an embodiment, the programming manager reads the smart label 28 or RFID memory 36 periodically during normal operation and the programming information read from the smart label 28 or RFID memory 36 processed by the programming manager to determine the state of the programming information and update the programmed configuration of the pluggable transceiver 10 accordingly.

In an embodiment, the programming manager programs the memory 24 when the controller 22 is initialized and the programming information data read from the RFID memory is different from the programming information data stored in memory 24, wherein the programming information data stored in memory 24 used to define the current operating configuration. In an embodiment, the programming manager erases the programmed configuration stored in the memory 24 or disables the pluggable transceiver 10 whenever the programming manager determines that the state of the programming information read from the RFID memory has changed or missing or invalid (e.g. the smart label 28 was removed or the contents of the RFID memory 36 altered after the pluggable transceiver 10 was first initialized) or when a new smart label 28 is attached to the pluggable transceiver 10 or when an external RFID reader 40 writes new programming information to the RFID memory 36. In an embodiment, the programming manager does not alter the programmed information stored in the memory 24 whenever the programming manager detects that the state of the programming information read from the RFID memory is failed, missing, changed, invalid, or not installed. In other embodiments, the programming manager requests the host enter a password or access code or licensing information or other information via the host interface 20 or the network interface 14, wherein said information is used to enable programming the memory 24 with the programming information data read from the RFID memory.

In an embodiment, a pluggable transceiver 10 manufacturer programs at least one smart label 28 with programming information data using and external RFID reader for each pluggable transceiver 10 manufactured. In another embodiment, a pluggable transceiver 10 manufacturer programs the RFID memory with programming information using and external RFID reader for each pluggable transceiver 10 manufactured. In an embodiment, such programming information identified and configured specifically for a pluggable transceiver 10 manufacturers product equipment code, wherein such product equipment code defines a pluggable transceiver 10 operating configuration. In an embodiment, a pluggable transceiver 10 configured to be programmed using any one of a plurality of smart labels 28, each smart label 28 identified with a different product equipment code. In an embodiment, a plurality of pluggable transceivers 10 each configured with a smart label 28 identified with the same product equipment code, wherein each pluggable transceiver operates in the same predetermined configuration. In an embodiment, the RFID memory configured to be programmed using any one of a plurality of programming information, each identified with a different product equipment code. For example, the smart label 28 or RFID memory 36 programmed with programming information, such programming information identified and comprising data configured for a specific product equipment code. For example, the programming information for a given SFP transceiver product equipment code defines a plurality of standard MSA host interface 20 memory map data fields and values to be programmed in the memory 24 while the programming information for a different SFP transceiver product equipment code defines a plurality of different standard MSA host interface 20 memory map data fields and values to be programmed in the memory 24. In an embodiment, the programming information programmed in each smart label 28 or each RFID memory 36 for a given product equipment code is unique to the pluggable transceiver 10 receiving said programming information. For example, the programming information for a given product equipment code contains a pluggable transceiver 10 serial number, wherein the serial number for each pluggable transceiver 10 manufactured is unique, therefore for a given product equipment code a plurality of programming information is provided each identified and configured with a unique serial number, said plurality of programming information is used to program a plurality of pluggable transceivers 10, each pluggable transceiver 10 programmed with the same product equipment code and with a different serial number stored in memory 24.

In an embodiment, the programming manager programs the memory 24 of a pluggable transceiver 10 using the programming information only when said pluggable transceiver 10 is compatible with said programming information, wherein the compatibility is based on comparing compatibility information stored in the smart label 28 or RFID memory 36 with compatibility information stored in the memory 24, for example compatibility is determined based on matching the product equipment code contained in the programming information with the product equipment code stored in memory 24. In an embodiment, the compatibility information data contained in the programming information includes at least one of the following:
  product equipment code;
  hardware compatibility code;
  programming information version code;
  licensing or licensee code;
  password.

For example, a manufacturer can program a smart label 28 or RFID memory 36 with RFID data, such RFID data containing a product equipment code and an MSA SFP+ transceiver host interface 20 memory map, data fields and corresponding values for memory map locations starting at A0H, memory map locations starting at A2h, proprietary host interface 20 memory map, data fields and/or values (e.g. to support a network function provided by a protocol processor 18). The programming manager can read the RFID data from the smart label 28 or RFID memory 36 and compare the product equipment code with the pluggable transceiver 10 product equipment code stored in memory 24, the programming manager programming the memory 24 using the programming information defined in the RFID if the pluggable transceiver 10 product equipment code is compatible with programming information product equipment code.

In some embodiments, the programming manager can write information to the smart label 28 or RFID memory 36, for example the pluggable transceiver 10 hardware serial number or other unique identifier, a password, a programming log, etc. For example, such information can be stored in the memory 24 when the pluggable transceiver 10 is manufactured, and the programming manager can write such information to the smart label 28 This information can be used to logically bind the smart label 28 to the pluggable transceiver 10 so that the smart label 28 cannot be reused by another pluggable transceiver 10.

Figure 11:
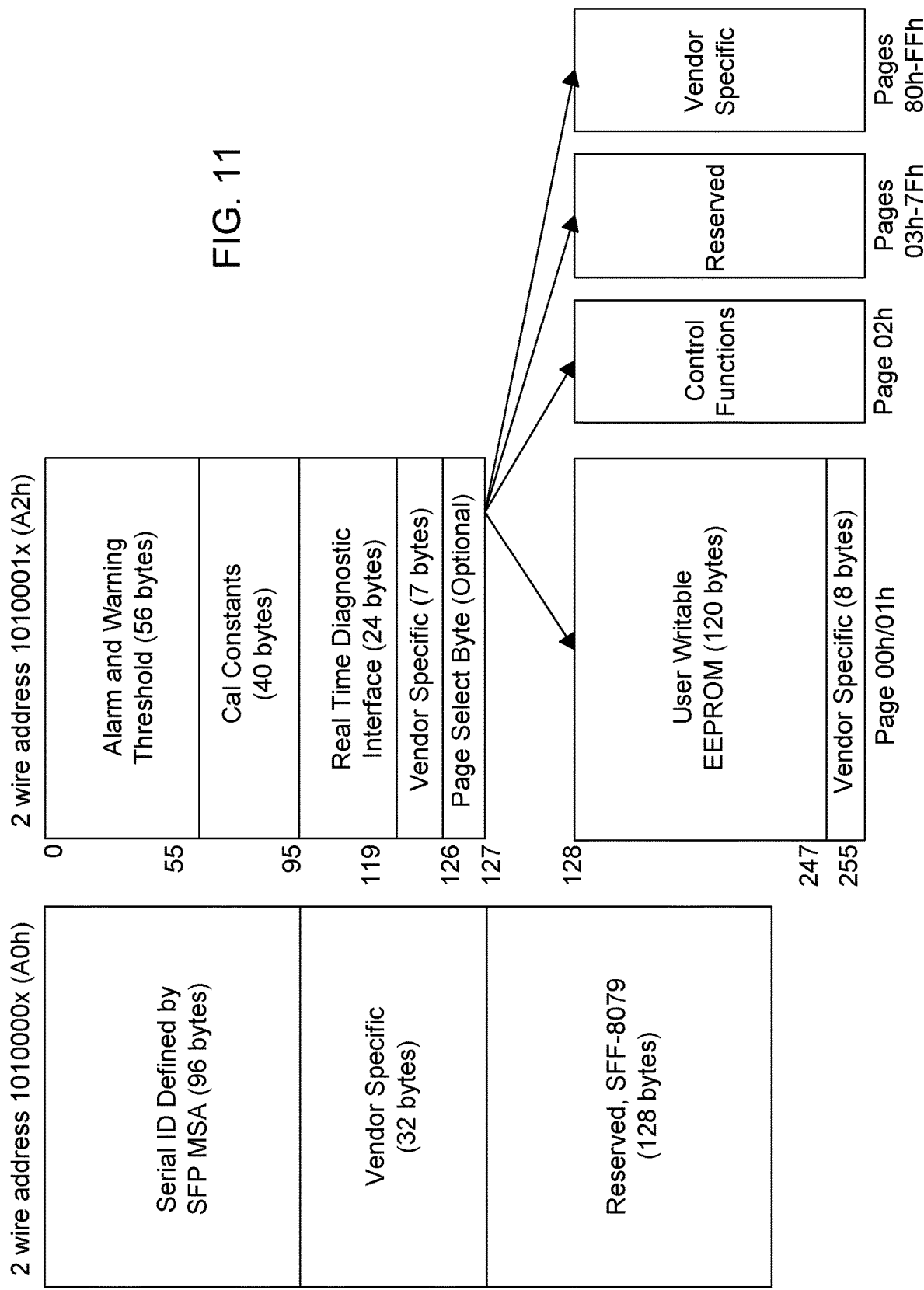
FIG. 11 is a table that describes the SFP+ memory map in accordance with SFF-8472.

In an embodiment, when a user installs and/or connects a pluggable transceiver 10 configured with a smart label 28 or with a RFID memory 36 having stored thereon data defining a desired programmed configuration in a host, the pluggable transceiver 10 can automatically power up, the controller 22 can start the initialization process, the programming manager can read the programming information stored in the smart label 28 or RFID memory 36, and the programming manager can determine the state of the programming information and the compatibility of the programming information with the pluggable transceiver 10. The programming manager can subsequently program the memory 24 according to the desired operating configuration defined by the RFID data the first time the controller 20 is initialized with such RFID data when the programming information defined by the RFID data is valid and compatible with the pluggable transceiver 10. For example, such programming information can consist of a product equipment code, and MSA SFP+ host interface 20 memory map for A0h and A2h shown in FIG. 11 containing a plurality of memory map data fields shown in FIG. 12, FIG. 13, and FIG. 14 and corresponding data field data, and can define a desired operating configuration to be programmed in memory 24 for a given pluggable transceiver 10 product equipment code.

In an embodiment, the external RFID reader 40 can be configured to obtain pluggable transceiver 10 identification information from a user interface or by scanning a bar code label or by reading a smart label 28 or an RFID memory 36, wherein the external RFID reader 40 uses said identification information to obtain a corresponding programming information from its local database and/or memory, and/or a network database and/or remote management system, and program the smart label 28 or the RFID memory 36 with said programming information. For example, said pluggable transceiver 10 identification information can be a product equipment code stored in memory 24.

Figure 15:
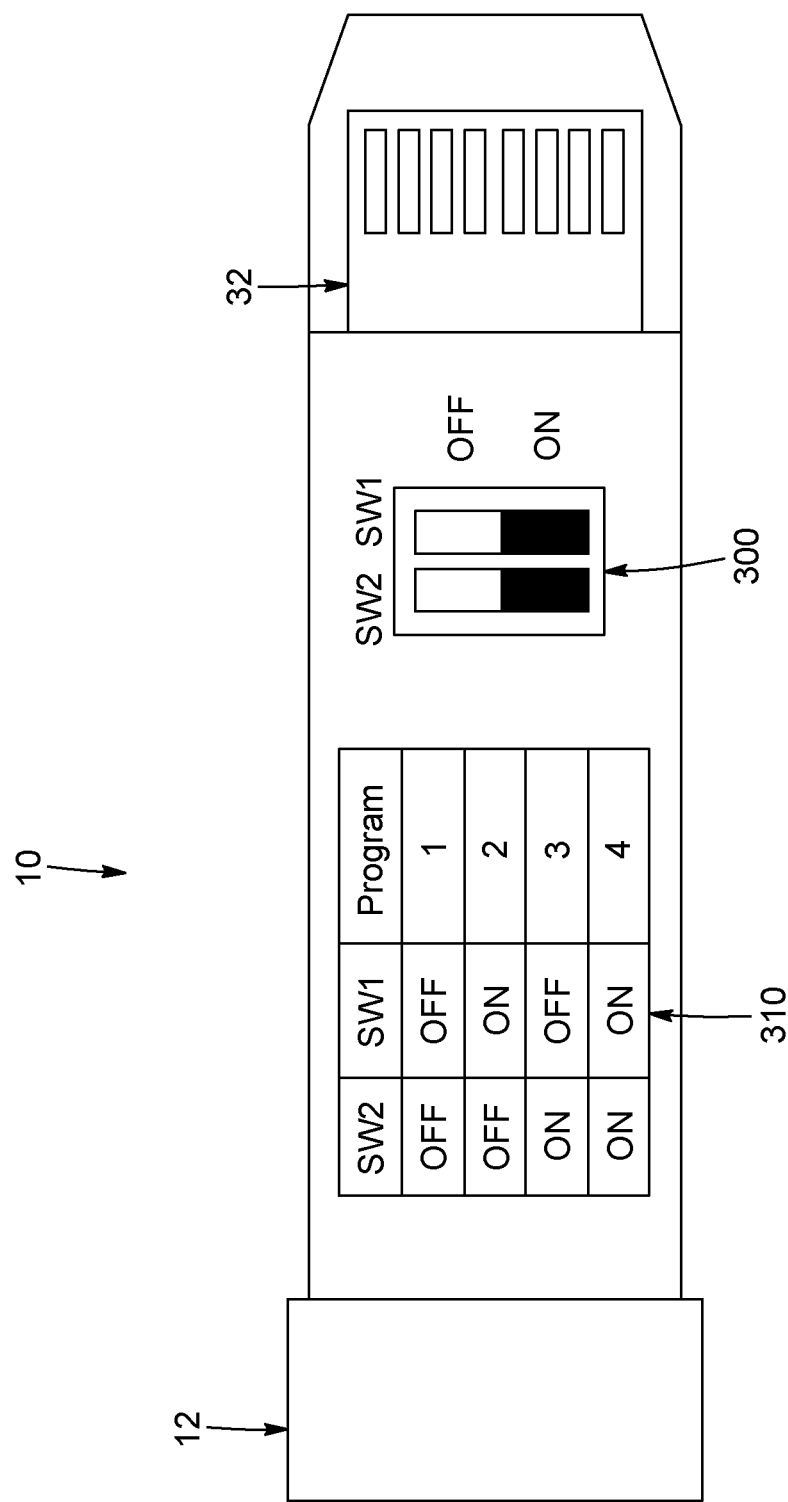
FIG. 15 is a bottom view of a pluggable transceiver according to an embodiment, in which the transceiver is programmable via programming switches.

In the embodiments described above, the pluggable transceiver 10 is programmable via a programming interface comprising an RFID device, such as a smart label 28 containing an RFID tag and/or an external RFID reader. As can be appreciated, the pluggable transceiver 10 can be configured with other types of programming interfaces to program the transceiver 10 in a desired operating configuration. For example, in an embodiment, the pluggable transceiver 10 can be configured with one or more switches, for example a dual in line package (DIP) switch, and the controller 22 can be configured with a corresponding switch interface, for example a general purpose input output (GPIO) interface. In such an embodiment, the programming manager can invoke the controller 22 to read the state of the switch or switches to obtain the programming information and to program the memory 24 according to the desired operating configuration defined by the switches (i.e. in this embodiment, a switch is used to provide the programming information instead of smart label 28 or an RFID memory 36). For example, FIG. 15 illustrates the bottom view of an SFP pluggable transceiver 10 with two DIP switches 300 and a table 310 indicating the programming information data (e.g. Program #) selected based on the position of each DIP switch. In some embodiments, said programming information can be used to index or point to memory address locations in memory 24 where the actual programming information and/or programmed configuration defining a desired operating configuration is stored. The programming information and/or programmed configuration can be pre-programmed in the memory 24, for example during the manufacturing process. Note that the number of possible programming information configurations provided using N switches is $2^N$. For example, each such programmed information stored in memory 24 can consist of an MSA SFP+ transceiver host interface 20 memory map for locations starting at A0h and A2h shown in FIG. 11, the memory map containing a plurality of data fields shown in FIG. 12, FIG. 13, and FIG. 14 and data field values that define a desired operating configuration of the pluggable transceiver 10, wherein a desired operating configuration can be selected using programming information defined by the switch.

An advantage of the programmable pluggable transceiver described herein is that it helps to reduce the quantity of purpose built pluggable transceiver types kept in inventory and the consequent cost overhead. Using the programming system and methods described herein, fewer purpose built pluggable transceivers types will be programmed during the manufacturing process since the programming of a pluggable transceiver can easily be performed at any point prior to the installation of the pluggable transceiver in a host. For example, an inventory of MSA compliant purpose-built optical pluggable transceivers each with a different programmed operating configuration can be replaced with a single optical pluggable transceiver 10 configured with an RFID reader 30 as described herein, and a plurality of smart labels 28 each containing RFID data with different programming information. Each programming smart label 28 can define a different desired operating configuration. In another example, an inventory of MSA compliant purpose-built optical pluggable transceivers each with a different programmed operating configuration can be replaced with a single optical pluggable transceiver 10 configured with an RFID memory 36 as described herein, and an external RFID reader 40 (e.g. a smart phone configured to program pluggable transceivers using RFID) can contain RFID data comprising programming information defining a plurality of different possible operating configurations. The transceiver 10 can be programmed with a desired one of the plurality of operating configurations using the RFID reader 40 before or during installation, for example. A further advantage of the programmable transceivers described herein is a reduction in the time and cost incurred in programming a plurality of pluggable transceivers to support a plurality of applications or operational scenarios using current methods due to the elimination of proprietary programming systems that power the pluggable transceiver and program its memory 24. Another advantage of programmable transceivers described herein is that they provide more flexibility to support unforecasted deployments since the pluggable transceiver 10 can easily be programmed in the field or in the supply chain to support a plurality of applications or operational scenarios by attaching the appropriate smart label 28 or by programming the RFID memory 36 prior to its installation in a host system. Another advantage of the programmable transceivers described herein is that they can reduce the time and expenses incurred in identifying a pluggable transceiver 10 including its programmed configuration while in the supply chain or during installation and maintenance, since the host interface 20 memory map data fields and values stored in memory 36 can be read using an external RFID reader 40. Another advantage of the programmable transceivers described herein is that a plurality of programming information including associated product specifications, etc. can be downloaded to the external RFID reader 40 from a network database of remote management. Another advantage of the programmable transceivers described herein is a reduction in the identification and programming errors introduced by operators during the device manufacturing or service lifecycle since pluggable transceiver 10 can be fully automated and does not require operator intervention except for the smart label 28 installation.

Exemplary embodiments have been described herein with respect to users programming pluggable transceivers; using a smart label with an embedded passive RFID tag; and using an external RFID reader. The described embodiments provide pluggable transceiver programming systems using RFID or other programming interfaces to enable cost effective pluggable transceiver manufacturing, and to minimize service provider supply chain and operational logistics and expenses. With pluggable transceivers as described herein, other areas of application such as inventory management using RFID as part of an entire enterprise supply chain management system can also be enabled. In such a supply chain management, an external RFID reader can interrogate each smart label 28 or RFID memory 36 to extract each pluggable transceiver's product/hardware/software information including the programming information, can send such information to a computer for administrative purposes, and can program each smart label and pluggable transceiver with programming information defining a desired operating configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A method for programming a network transceiver, the method comprising the steps of:
   a) receiving RFID data from an RFID device in proximity to the network transceiver, said RFID data being received via an RFID antenna in communication with an RFID reader or an RFID memory positioned inside an electromagnetically shielding housing of the network transceiver, said RFID data defining an operating configuration of the network transceiver; and
   b) programming the network transceiver according to the operating configuration defined by the received RFID data;
   wherein the RFID antenna is positioned inside the electromagnetically shielding housing of the network transceiver, further wherein the RFID data is received via an RFID signal passing through a dielectric interface in the electromagnetically shielding housing.

2. The method according to claim 1, wherein the RFID device comprises an RFID tag or an RFID reader/writer.

3. The method according to claim 1, wherein step b) is performed after installing or connecting the network transceiver in a host device.

4. The method according to claim 1, wherein step a) is performed prior to powering up the network transceiver.

5. The method according to claim 1, wherein the RFID data comprises program instructions or operating parameters, further wherein programming the network transceiver comprises loading the program instructions or operating parameters into memory onboard the network transceiver.

6. The method according to claim 1, wherein the RFID data comprises a memory address pointing to a location in memory onboard the network transceiver comprising program instructions or operating parameters, further wherein programming the network transceiver comprises loading the program instructions or operating parameters from said location in memory.

7. The method according to claim 1, wherein the RFID data comprises a network location, further wherein programming the network transceiver comprises retrieving program instructions or operating parameters from the network location, and loading the retrieved program instructions or operating parameters into memory onboard the network transceiver.

8. The method according to claim 1, wherein the RFID data comprises an identifier, further wherein programming the network transceiver comprises loading program instructions or operating parameters preloaded in memory onboard the network transceiver corresponding to the identifier.

9. The method according to claim 1, wherein the RFID data comprises compatibility data, further wherein programming the network transceiver comprises a preliminary step of validating whether the network transceiver is compatible with the operating configuration defined by the RFID data.

10. The method according to claim 1, wherein step b) comprises determining whether the network transceiver is already programmed in a current operating configuration, and programming the network transceiver if the network transceiver is not already in a programmed configuration, or if the current operating configuration of the network transceiver differs from the operating configuration defined by the RFID data.

11. The method according to claim 1, wherein the RFID antenna extends at least partially outside the electromagnetically shielding housing of the network transceiver.

12. The method according to claim 1, wherein the RFID antenna is detachably connected to the network transceiver.

13. A network transceiver comprising:
an electromagnetically shielding housing;
a host interface for connecting to a host;
a network interface for transmitting and receiving signals to and from a network;
an RFID antenna for receiving RFID data from an RFID device in proximity to the network transceiver;
an RFID reader or an RFID memory positioned within the electromagnetically shielding housing, and in communication with the RFID antenna; and
a controller in operative communication with the network interface or host interface and with the RFID reader or RFID memory, said controller operating the network interface or host interface according to an operating configuration, wherein the operating configuration of the controller is programmed using the RFID data received via the RFID antenna and RFID reader or RFID memory;
wherein the electromagnetically shielding housing comprises sidewalls made from an electromagnetically shielding material, and comprises a dielectric interface for allowing electromagnetic signals to pass therethrough, said dielectric interface being surrounded by the shielding material.

14. The network transceiver according to claim 13, wherein the RFID antenna is positioned inside the electromagnetically shielding housing and adjacent the dielectric interface.

15. The network transceiver according to claim 13, wherein the dielectric interface is covered with a smart label comprising an RFID tag embedded therein.

16. The network transceiver according to claim 13, wherein the dielectric interface is defined by at least one aperture in a sidewall of the housing.

17. The network transceiver according to claim 13, further comprising an internal RFID repeater for relaying RFID signals from an exterior of the housing to the RFID antenna, said RFID repeater comprising first and second repeater antennas positioned within the housing, the first repeater antenna being positioned proximate the dielectric interface, and the second repeater antenna being positioned proximate the RFID antenna.

18. The network transceiver according to claim 13, further comprising an external RFID repeater for relaying RFID signals from an exterior of the housing to the RFID antenna, said RFID repeater comprising first and second repeater antennas positioned on an exterior of the housing, the first repeater antenna being positioned adjacent the dielectric interface and the second repeater antenna being spaced apart from the first repeater antenna and positioned to interface with an external RFID device.

19. A non-transitory computer-readable medium having instruction stored thereon which, when executed by a controller of a network transceiver having an RFID antenna in communication with an RFID reader or RFID memory positioned within an electromagnetically shielding housing, cause the processor to:
a) receive RFID data from an RFID device in proximity to the network transceiver via the RFID antenna and RFID reader or RFID memory, said RFID data defining an operating configuration of the network transceiver; and
b) program a controller in the network transceiver according to the operating configuration defined by the received RFID data;
wherein the RFID data comprises compatibility data and programming the network transceiver comprises a preliminary step of validating whether the network transceiver is compatible with the operating configuration defined by the RFID data.

20. A method for programming a network transceiver, the method comprising the steps of:
a) receiving RFID data from an RFID device in proximity to the network transceiver, said RFID data being received via an antenna in communication with an RFID reader or an RFID memory positioned inside an electromagnetically shielding housing of the network transceiver, said RFID data defining an operating configuration of the network transceiver; and
b) programming the network transceiver according to the operating configuration defined by the received RFID data;
wherein the RFID data comprises compatibility data, further wherein programming the network transceiver comprises a preliminary step of validating whether the network transceiver is compatible with the operating configuration defined by the RFID data.

21. A method for programming a network transceiver, the method comprising the steps of:
   a) receiving RFID data from an RFID device in proximity to the network transceiver, said RFID data being received via an antenna in communication with an RFID reader or an RFID memory positioned inside an electromagnetically shielding housing of the network transceiver, said RFID data defining an operating configuration of the network transceiver; and
   b) determining whether the network transceiver is already programmed in a current operating configuration, and programming the network transceiver according to the operating configuration defined by the received RFID data if the network transceiver is not already in a programmed configuration, or if the current operating configuration of the network transceiver differs from the operating configuration defined by the RFID data.

22. A non-transitory computer-readable medium having instruction stored thereon which, when executed by a controller of a network transceiver having an RFID antenna in communication with an RFID reader or RFID memory positioned within an electromagnetically shielding housing, cause the processor to:
   a) receive RFID data from an RFID device in proximity to the network transceiver via the RFID antenna and RFID reader or RFID memory, said RFID data defining an operating configuration of the network transceiver; and
   b) determine whether the network transceiver is already programmed in a current operating configuration, and program the network transceiver according to the operating configuration defined by the received RFID data if the network transceiver is not already in a programmed configuration, or if the current operating configuration of the network transceiver differs from the operating configuration defined by the RFID data.

23. A method for programming a network transceiver, the method comprising the steps of:
   a) receiving RFID data from an RFID device in proximity to the network transceiver, said RFID data being received via an RFID antenna in communication with an RFID reader or an RFID memory positioned inside an electromagnetically shielding housing of the network transceiver, said RFID data defining an operating configuration of the network transceiver; and
   b) programming the network transceiver according to the operating configuration defined by the received RFID data;
   wherein the RFID antenna extends at least partially outside the electromagnetically shielding housing of the network transceiver.

24. The method according to claim 23, wherein the RFID device comprises an RFID tag or an RFID reader/writer.

25. The method according to claim 23, wherein step b) is performed after installing or connecting the network transceiver in a host device.

26. The method according to claim 23, wherein step a) is performed prior to powering up the network transceiver.

27. The method according to claim 23, wherein the RFID data comprises program instructions or operating parameters, further wherein programming the network transceiver comprises loading the program instructions or operating parameters into memory onboard the network transceiver.

28. The method according to claim 23, wherein the RFID data comprises a memory address pointing to a location in memory onboard the network transceiver comprising program instructions or operating parameters, further wherein programming the network transceiver comprises loading the program instructions or operating parameters from said location in memory.

29. The method according to claim 23, wherein the RFID data comprises a network location, further wherein programming the network transceiver comprises retrieving program instructions or operating parameters from the network location, and loading the retrieved program instructions or operating parameters into memory onboard the network transceiver.

30. The method according to claim 23, wherein the RFID data comprises an identifier, further wherein programming the network transceiver comprises loading program instructions or operating parameters preloaded in memory onboard the network transceiver corresponding to the identifier.

31. The method according to claim 23, wherein the RFID data comprises compatibility data, further wherein programming the network transceiver comprises a preliminary step of validating whether the network transceiver is compatible with the operating configuration defined by the RFID data.

32. The method according to claim 23, wherein step b) comprises determining whether the network transceiver is already programmed in a current operating configuration, and programming the network transceiver if the network transceiver is not already in a programmed configuration, or if the current operating configuration of the network transceiver differs from the operating configuration defined by the RFID data.

33. The method according to claim 23, wherein the RFID antenna is detachably connected to the network transceiver.

34. A network transceiver comprising:
   an electromagnetically shielding housing;
   a host interface for connecting to a host;
   a network interface for transmitting and receiving signals to and from a network;
   an RFID antenna for receiving RFID data from an RFID device in proximity to the network transceiver;
   an RFID reader or an RFID memory positioned within the electromagnetically shielding housing, and in communication with the RFID antenna; and
   a controller in operative communication with the network interface or host interface and with the RFID reader or RFID memory, said controller operating the network interface or host interface according to an operating configuration, wherein the operating configuration of the controller is programmed using the RFID data received via the RFID antenna and RFID reader or RFID memory;
   further comprising a metallic housing enclosing the controller and RFID antenna, and an RFID repeater extending between an interior and an exterior of the housing, said RFID repeater comprising a first repeater antenna positioned on the exterior of the housing, and a second repeater antenna positioned in the interior of the housing.

35. The network transceiver according to claim 34, wherein the RFID antenna is positioned inside the electromagnetically shielding housing and adjacent the second repeater antenna.

36. The network transceiver according to claim 34, wherein the first repeater antenna is covered with a smart label comprising an RFID tag embedded therein.

37. The network transceiver according to claim 34, further comprising an external RFID repeater for relaying RFID signals, said RFID repeater comprising first and second external repeater antennas positioned on the exterior of the housing, the first external repeater antenna being positioned adjacent the first repeater antenna, and the second external repeater antenna being spaced apart from the first external repeater antenna and positioned to interface with an external RFID device.

* * * * *